(12) United States Patent
Sekiguchi

(10) Patent No.: US 8,616,742 B2
(45) Date of Patent: Dec. 31, 2013

(54) VEHICLE LIGHTING UNIT

(75) Inventor: Tatsuya Sekiguchi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/540,603

(22) Filed: Jul. 2, 2012

(65) Prior Publication Data

US 2013/0083553 A1     Apr. 4, 2013

(30) Foreign Application Priority Data

Jul. 1, 2011   (JP) ................................. 2011-147615

(51) Int. Cl.
*F21V 33/00*      (2006.01)

(52) U.S. Cl.
USPC ........... 362/516; 362/507; 362/517; 362/298; 362/301

(58) Field of Classification Search
USPC ......... 362/507, 516, 517, 518, 538, 539, 543, 362/544, 545, 297, 298, 301, 346
See application file for complete search history.

(56) References Cited

U.S. PATENT DOCUMENTS

| | | | |
|---|---|---|---|
| 7,325,954 B2 * | 2/2008 | Futami ........................... | 362/538 |
| 7,607,811 B2 * | 10/2009 | Okada ........................... | 362/545 |
| 8,038,334 B2 * | 10/2011 | Ishida ........................... | 362/539 |
| 8,337,063 B2 * | 12/2012 | Nagasawa et al. ........... | 362/547 |
| 2007/0236953 A1 * | 10/2007 | Nakazawa et al. ........... | 362/544 |
| 2011/0199777 A1 * | 8/2011 | Naganawa ..................... | 362/539 |
| 2013/0003401 A1 * | 1/2013 | Sekiguchi et al. ............ | 362/517 |

FOREIGN PATENT DOCUMENTS

JP               4666160 B2      4/2011

* cited by examiner

*Primary Examiner* — Laura Tso

(74) *Attorney, Agent, or Firm* — Kenealy Vaidya LLP

(57) ABSTRACT

A vehicle lighting unit can include a first lens and a second lens disposed below the first lens, and a first semiconductor light-emitting device disposed substantially at a vehicle rear-side focal point of the first lens. Light emitted from the first semiconductor light-emitting device in a narrow angle direction can be incident on the first lens. A first reflector can be disposed diagonally forward and downward with respect to the first semiconductor light-emitting device such that light emitted from the first semiconductor light-emitting device in a wide angle direction is incident thereon and reflected diagonally rearward and downward. The light emitted in the narrow angle direction and incident on the first lens having a luminous intensity higher than the light emitted in the wide angle direction. A second reflector can be disposed diagonally rearward and downward with respect to the first reflector.

19 Claims, 11 Drawing Sheets

VEHICLE LIGHTING UNIT

This application claims the priority benefit under 35 U.S.C. §119 of Japanese Patent Application No. 2011-147615 filed on Jul. 1, 2011, which is hereby incorporated in its entirety by reference.

TECHNICAL FIELD

The presently disclosed subject matter relates to a vehicle lighting unit, and particularly to a vehicle lighting unit including vertically arranged lenses.

BACKGROUND ART

Vehicle lamps including vertically arranged lenses have been proposed (see, for example, Japanese Patent No. 4666160 or U.S. Pat. No. 7,325,954 corresponding to JP Patent No. 4666160).

As shown in FIG. 1, a vehicle lamp 200 described in Japanese Patent No. 4666160 can include vertically arranged lenses 210A and 210B, an HID bulb 220, an upper reflector 230A, a lower reflector 230B, and the like. In the vehicle lamp 200 configured as described above, upward light emitted from the HID bulb 220 can be reflected by the upper reflector 230A, pass through the upper lens 210A, and then be projected toward the front. Downward light emitted from the HID bulb 220 can be reflected by the lower reflector 230B and the like, pass through the lower lens 210B, and then be projected toward the front.

In recent years, semiconductor light-emitting devices such as LEDs are receiving attention from the viewpoint of power saving and the like. In the field of vehicle lamps, it is also contemplated to use semiconductor light-emitting devices instead of HID bulbs and the like.

In general, a semiconductor light-emitting device such as an LED is said to be a light source having directional characteristics. More specifically, the luminous intensity of the light source is maximum on its optical axis and decreases as the inclination with respect to the optical axis increases (see FIG. 6). Therefore, when the HID bulb 220 is simply replaced with a semiconductor light-emitting device such as an LED, the difference between the luminous intensity (difference in luminance) through the upper lens and that through the lower lens is noticeable when the lenses are viewed from a viewpoint in front of the vehicle (a viewpoint above a horizontal line, for example, the viewpoint of a pedestrian in front of the vehicle or the driver of an oncoming vehicle). This causes a problem in that the brightnesses observed through the lenses are different from each other.

SUMMARY

The presently disclosed subject matter was devised in view of these and other problems and features and in association with the conventional art. According to an aspect of the presently disclosed subject matter, a vehicle lighting unit can be configured to allow the brightnesses of light observed through vertically arranged lenses to match or almost match (i.e., substantially match) when the lenses are viewed from a viewpoint in front of the vehicle (a certain viewpoint above a horizontal line).

According to another aspect of the presently disclosed subject matter, a vehicle lighting unit can have an upper first optical axis extending in a front-rear direction of a vehicle and a lower second optical axis extending in the front-rear direction of the vehicle and positioned below the first optical axis and can include: a first lens disposed on the first optical axis and having a focal point on a vehicle rear-side; a second lens disposed on the second optical axis and having a focal point on a vehicle rear-side; a first semiconductor light-emitting device disposed at or near at or near (i.e. substantially at) the vehicle rear-side focal point of the first lens and having a light emission surface directed to the first lens and an element optical axis such that light emitted from the first semiconductor light-emitting device in a narrow angle direction with respect to the element optical axis is incident on the first lens; a first reflector disposed diagonally forward and downward with respect to the first semiconductor light-emitting device such that light emitted from the first semiconductor light-emitting device in a wide angle direction with respect to the element optical axis is incident thereon and reflected diagonally rearward and downward, the light emitted in the narrow angle direction and incident on the first lens having a luminous intensity higher than the light emitted in the wide angle direction and incident on the first reflector does; and a second reflector disposed diagonally rearward and downward with respect to the first reflector such that the light reflected diagonally rearward and downward from the first reflector is incident thereon. In this configuration, the second reflector can extend from the vehicle rear-side focal point of the second lens or from a vicinity of the focal point thereof to an area diagonally forward and downward and can be disposed below the second optical axis.

In the vehicle lighting unit configured as above, although the light passing through the second lens is relatively low luminous intensity light, that light can be projected only (or substantially only) in an upward direction with respect to a horizontal plane by the action of the first reflector and the second reflector. This can allow the luminous intensity of light through the first lens and the luminous intensity of light through the second lens to match (or substantially match) when the lenses are viewed from a viewpoint in front of the vehicle. Namely, this can allow the brightnesses observed through the first and second lenses to match (or substantially match) when the lenses are viewed from a viewpoint in front of the vehicle.

The vehicle lighting unit with the above configuration can further include: a second semiconductor light-emitting device disposed on a rear side of the vehicle rear-side focal point of the second lens and configured to emit light substantially upward, the semiconductor light-emitting device having an element optical axis; a third reflector disposed above the second semiconductor light-emitting device such that light emitted from the second semiconductor light-emitting device in a narrow angle direction with respect to the element optical axis of the second semiconductor light-emitting device is incident on the third reflector, the light emitted in the narrow angle direction and incident on the third reflector having a luminous intensity higher than light emitted from the second semiconductor light-emitting device in a wide angle direction; and a shade disposed between the second lens and the second semiconductor light-emitting device and configured to block part of light emitted from the second semiconductor light-emitting device and reflected by the third reflector, and wherein the third reflector can be a revolved ellipsoidal reflector having a first focal point at or near (i.e., substantially at) the second semiconductor light-emitting device and a second focal point at or near (i.e., substantially at) the vehicle rear-side focal point of the second lens.

With the above configuration, if the first semiconductor light-emitting device is turned on and the second semiconductor light-emitting device is turned off, for example, the vehicle lighting unit can serve as a daytime running lamp (DRL). On the other hand, if the first semiconductor light-emitting device is turned on with less power so as to emit light with reduced light intensity and the second semiconductor light-emitting device is turned on, the vehicle lighting unit can serve as a vehicle headlamp configured to form a low beam light distribution pattern as well as a positioning lamp.

This means that the vehicle lighting unit with the above configuration can serve as a multifunctional combination vehicle lighting unit having combined functions of a DRL type lamp and a vehicle headlamp for forming a low beam light distribution pattern (also serving as a positioning lamp).

In the above configurations of the vehicle lighting unit, the distance between the first lens at its lower edge and the second lens at its upper edge in the vertical direction can be 15 mm or less. In the vehicle lighting unit configured as above, the first lens and the second lens can be visually recognized as a single light-emitting region.

In the above configurations of the vehicle lighting unit, the narrow angle directions can range within ±60° with respect to the element optical axis and the wide angle directions can range outside ±60° with respect to the element optical axis.

Alternatively, in the above configurations of the vehicle lighting unit, the narrow angle directions can range within ±25° with respect to the element optical axis and the wide angle directions can range outside ±25° with respect to the element optical axis.

According to the presently disclosed subject matter, a vehicle lighting unit can be provided which allows brightnesses observed through the vertically arranged lenses to match (or substantially match) when the vehicle lighting unit is viewed from a viewpoint in front of the vehicle (a certain viewpoint above the horizontal line).

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings and in accordance with exemplary embodiments.

In the present specification, it should be noted that the upper (upward), lower (downward), left, right, back (rearward), and front (forward) directions are based on a typical posture of a vehicle body to which the vehicle lighting unit is installed unless otherwise specified.

Figure 1:
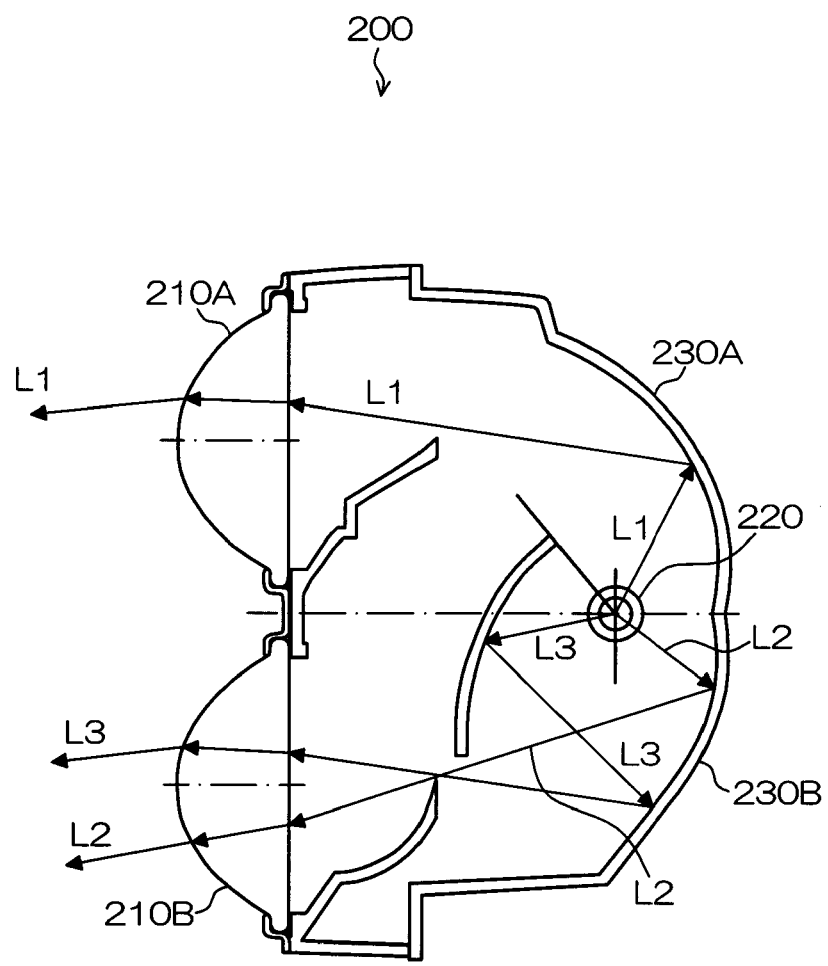
FIG. 1 is a vertical cross-sectional view of a conventional vehicle lamp taken along a vertical plane including the optical axis thereof.
Figure 2:
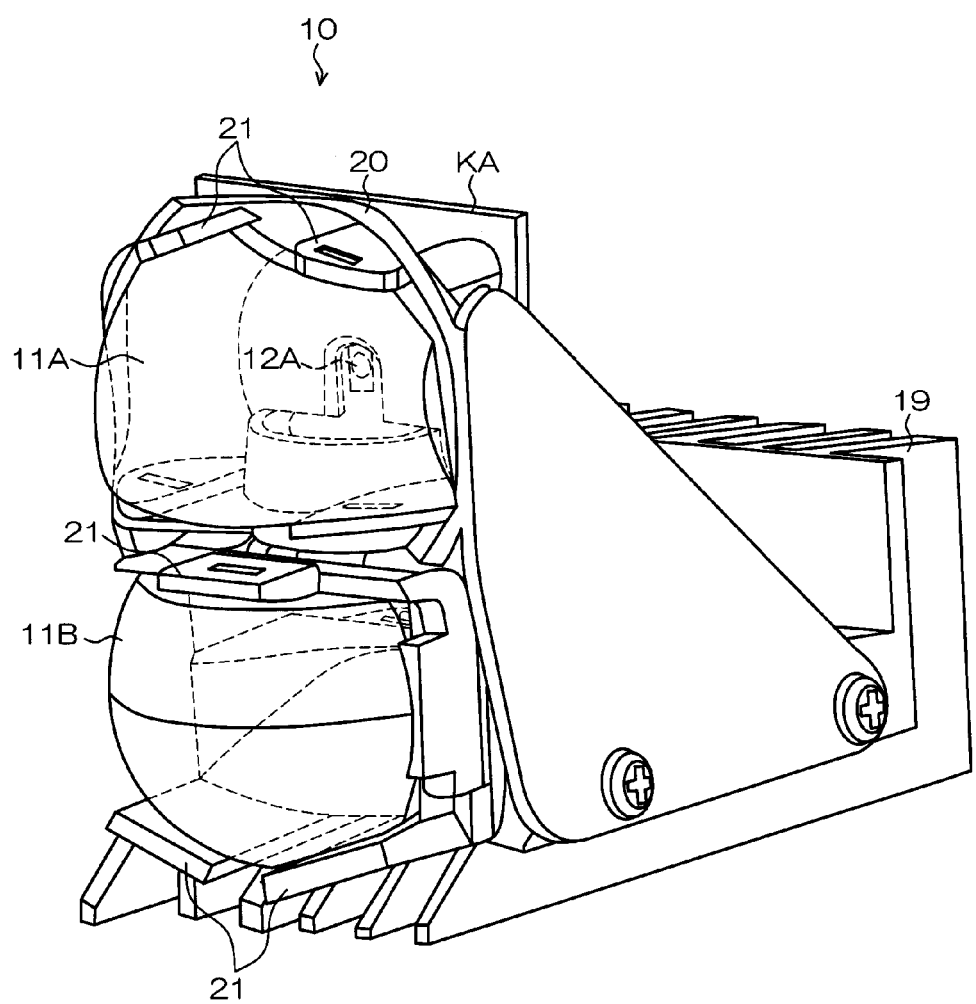
FIG. 2 is a perspective view of a vehicle lighting unit in an exemplary embodiment made in accordance with principles of the presently disclosed subject matter.

FIG. 2 is a perspective view of an embodiment of a vehicle lighting unit 10 made in accordance with principles of the presently disclosed subject matter. The vehicle lighting unit 10 can serve as a multifunctional combination vehicle lighting unit having combined functions of a DRL type lamp and a vehicle headlamp (also serving as a positioning lamp). At least one vehicle lighting unit 10 of the present exemplary embodiment can be disposed on each of the front left and right sides of a vehicle body such as an automobile.

Figure 3:
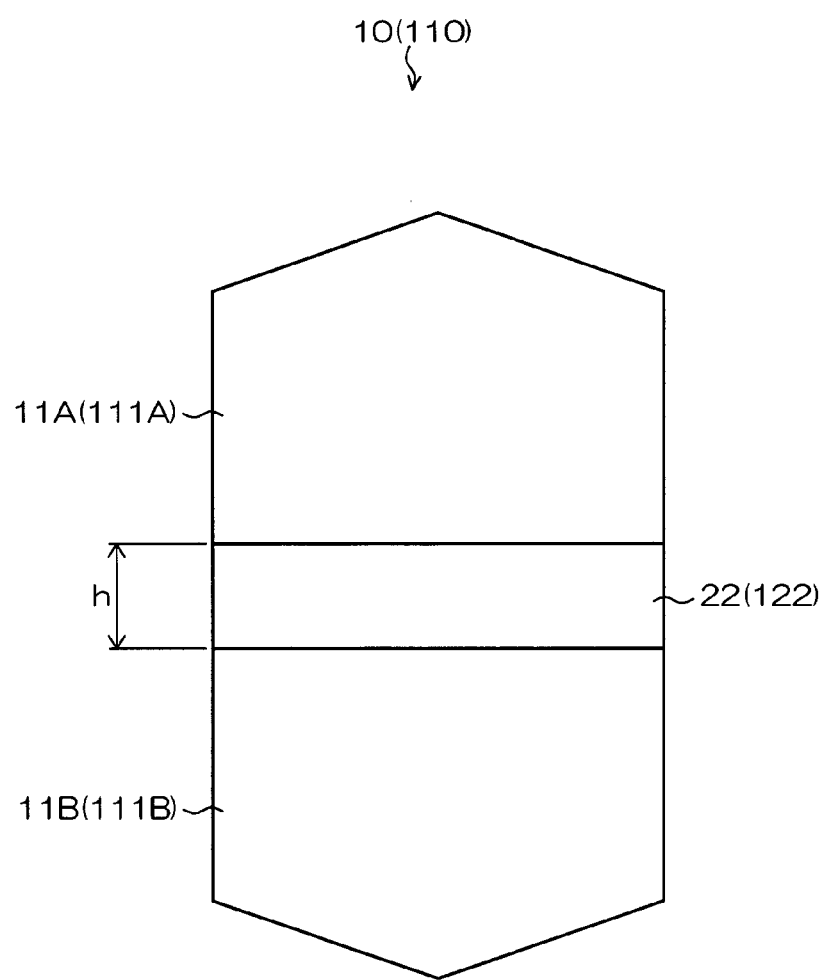
FIG. 3 is a front view of the vehicle lighting unit of FIG. 2.
Figure 4:
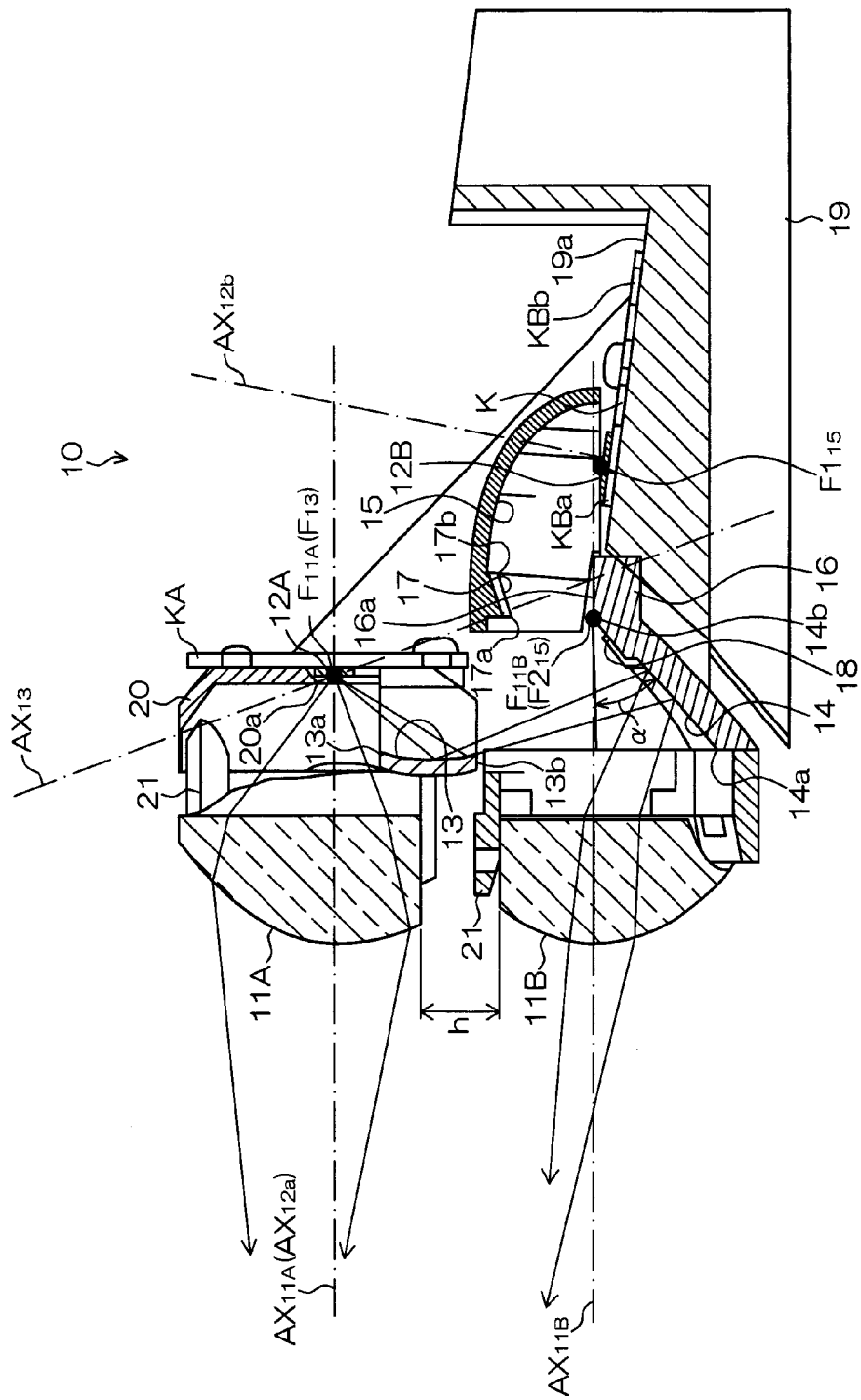
FIG. 4 is a vertical cross-sectional view of the vehicle lighting unit taken along a vertical plane including a first optical axis $AX_{11A}$ and a second optical axis $AX_{11B}$ of the vehicle lighting unit of FIG. 2.

FIG. 3 is a front view of the vehicle lighting unit 10, and FIG. 4 is a vertical cross-sectional view of the vehicle lighting unit 10 taken along a vertical plane including a first optical axis $AX_{11A}$ and a second optical axis $AX_{11B}$ of the vehicle lighting unit 10.

As shown in FIGS. 2 to 4, the vehicle lighting unit 10 can include: a first lens 11A having a focal point $F_{11A}$ on a vehicle rear-side; a second lens 11B disposed below the first lens 11A and having a focal point $F_{11B}$ on the vehicle rear-side; a first semiconductor light-emitting device 12A disposed at or near (i.e., substantially at) the vehicle rear-side focal point $F_{11A}$ of the first lens 11A; a second semiconductor light-emitting device 12B disposed on the rear side of the vehicle rear-side focal point $F_{11B}$ of the second lens 11B and positioned substantially at the second optical axis $AX_{11B}$; a first reflector 13 disposed diagonally forward and downward with respect to the first semiconductor light-emitting device 12A; a second reflector 14 disposed diagonally rearward and downward with respect to the first reflector 13; a third reflector 15 disposed above the second semiconductor light-emitting device 12B; a shade 16 disposed between the second lens 11B and the second semiconductor light-emitting device 12B and configured to block part of the light emitted from the second semiconductor light-emitting device 12B and reflected by the third reflector 15; a fourth reflector 17 disposed between the second lens 11B and the third reflector 15; a fifth reflector 18 disposed obliquely forward and downward with respect to the fourth reflector 17; a heat sink 19; an upper reflector 20; a lens holder 21; a decoration member 22; etc.

As shown in FIG. 4, the first lens 11A can be held by the lens holder 21 secured to the heat sink 19 (or the upper reflector 20 or the like) and be disposed on the upper first optical axis $AX_{11A}$ extending in the front-rear direction of the vehicle. Similarly, the second lens 11B can be held by the lens holder 21, be disposed on the lower second optical axis $AX_{11B}$ extending in the front-rear direction of the vehicle, and be placed at a position below the first lens 11A with a separation distance h therefrom. The distance h is desirably 15 [mm] or less (for example, 10 [mm]). With this configuration, the first lens 11A and the second lens 11B can be visually recognized as a single light-emitting region.

The respective optical axes $AX_{11A}$ and $AX_{11B}$ are contained in a single vertical plane and extend in a substantially horizontal direction. Therefore, the respective lenses 11A and 11B can be visually recognized such that they are arranged in a vertical direction and directed in the same direction. The second optical axis $AX_{11B}$ may be slightly inclined with respect to a horizontal plane such that the axis $AX_{11B}$ is higher (or lower) on the front side of the vehicle than on the rear side. In this case, the respective lenses 11A and 11B can be visually recognized such that they are arranged vertically and directed in different directions. The respective optical axes $AX_{11A}$ and $AX_{11B}$ may not be contained in a single vertical plane but may be contained in different vertical planes. In this case, the respective lenses 11A and 11B can be visually recognized such that they are arranged in a vertically diagonal direction.

Each of the lenses 11A and 11B can be, for example, a plano-convex aspherical projection lens having a convex surface on the front side thereof and a flat surface on the rear side thereof. The first lens 11A and the second lens 11B can be formed as projection lenses having the same shape, the same size, and the same focal length. However, the first lens 11A and the second lens 11B may be formed as projection lenses having different shapes, different sizes, and different focal lengths.

In the present exemplary embodiment, each of the lenses 11A and 11B can have an outer circumference cut into a hexagonal shape as viewed from the front (see FIG. 3). The respective lenses 11A and 11B may be projection lenses having circular, ellipsoidal, or n-sided polygonal (n is an integer of 3 or larger) shapes or other shapes.

The first lens 11A and the second lens 11B can be molded by injecting a transparent resin (such as an acrylic resin or polycarbonate) into a mold and cooling the resin to solidify it. Note that the first lens 11A and the second lens 11B can be integrally molded, so that they can be configured as a single member. This allows a reduction in the number of components, simplification of the step of attaching the respective lenses 11A and 11B, a reduction in attachment errors of the respective lenses 11A and 11B, etc. as compared to the case where the first lens 11A and the second lens 11B are configured as independent components.

A space h extending horizontally (in a direction perpendicular to the sheet of FIG. 4) can be formed between the lowermost end edge of the first lens 11A and the uppermost end edge of the second lens 11B. The decoration member 22 extending horizontally can be disposed in the space h (see FIG. 3). The surface of the decoration member 22 may be subjected to mirror finish processing such as vapor deposition of aluminum. The decoration member 22 can be secured to the space h by well-known attaching means such as bonding or fitting. The height of the decoration member 22 may be equal to or less than the distance h (for example, 10 [mm]).

A description will next be given of an optical system for forming a DRL-dedicated light distribution pattern.

The optical system can include the first lens 11A, the second lens 11B, the first semiconductor light-emitting device 12A, the first reflector 13, and the second reflector 14.

Figure 5A:
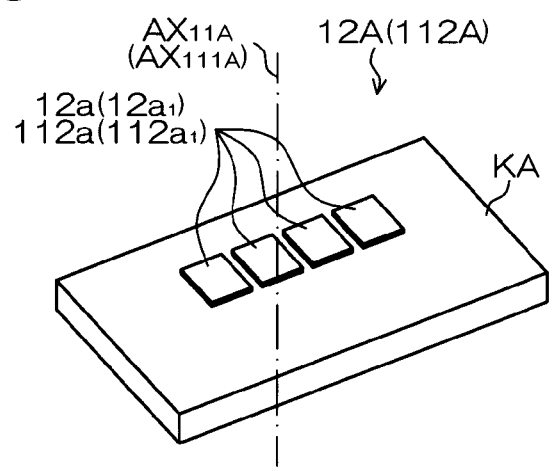
FIGS. 5A and 5B are perspective views of first and second semiconductor light-emitting devices, respectively, of the vehicle lighting unit of FIG. 2.

FIG. 5A is a perspective view of the first semiconductor light-emitting device 12A.

The first semiconductor light-emitting device 12A can be, for example, a single light source in which a plurality of LED chips 12a (for example, four 1 mm-square blue LED chips) are packaged. Each of the LED chips 12a may be covered with a phosphor (for example, a YAG phosphor (a yellow phosphor)). The number of LED chips 12a is not limited to 4 and may be 1 to 3 or 5 or more.

The LED chips 12a can be mounted on a first substrate KA secured to the upper reflector 20 such that the light emission surface $12_{a1}$ is directed forward of the vehicle body. Furthermore, the LED chips $12_a$ can be disposed at or near (i.e., substantially at) the vehicle rear-side focal point $F_{11A}$ of the first lens 11A. Each of the LED chips 12a can have an optical axis $AX_{12a}$ that extends in the substantially same direction as the first optical axis $AX_{11A}$. The upper reflector 20 can have an opening 20a, through which the respective LED chips 12a are exposed. The respective LED chips 12a can be arranged in a row (in a direction perpendicular to the sheet of FIG. 4) at predetermined intervals with their edges along a horizontal line orthogonal to the first optical axis $AX_{11A}$ so as to be symmetric with respect to the first optical axis $AX_{11A}$. (See FIG. 5A.)

A power cable can be electrically connected between the first semiconductor light-emitting device 12A and a not-shown lighting circuit, which can supply the first semiconductor light-emitting device 12A with a constant current, thereby performing turning-on/turning-off control.

Figure 6:
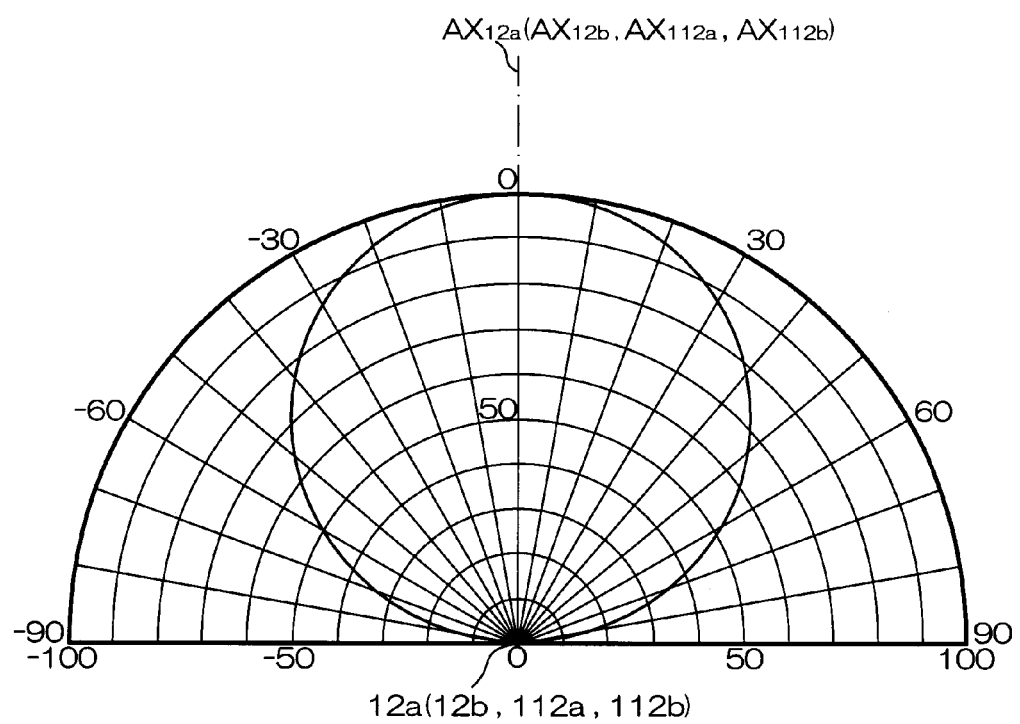
FIG. 6 shows an example of the directional characteristics of an LED chip in the first semiconductor light-emitting device of FIG. 5A.

FIG. 6 shows an example of the directional characteristics of one of the LED chips 12a in the first semiconductor light-emitting device 12A. It should be noted that the directional characteristics of one of the LED chips 12b in the second semiconductor light-emitting device 12B can be the same as that of the first semiconductor light-emitting device 12A.

The directional characteristics mean the ratio of the luminous intensity in a direction inclined at a given angle with respect to the element optical axis $AX_{12a}$ of the LED chip 12a in the semiconductor light-emitting device with the luminous intensity on the element optical axis $AX_{12a}$ of the LED chip 12a being set to 100%. The directional characteristics represent the spread of light emitted from the LED chip 12a in the semiconductor light-emitting device 12. The angle at which the ratio of luminous intensity is 50% is a half-value angle. In FIG. 6, the half-value angle is ±60°.

The first semiconductor light-emitting device 12A is not limited to include the LED chips 12a so long as it is a light source device including surface light-emitting chips used substantially as point light-emitting chips. For example, the first semiconductor light-emitting device 12A may include light-emitting diodes or laser diodes other than LED chips.

Relatively high luminous intensity light emitted from the first semiconductor light-emitting device 12A in narrow angle directions with respect to the element optical axis $AX_{12a}$ of the first semiconductor light-emitting device 12A (for example, light within ±25° in FIG. 6) and relatively low luminous intensity light emitted in wide angle directions with respect to the element optical axis $AX_{12a}$ (for example, light outside ±25° in FIG. 6) can travel along the following optical paths. It should be noted that the light emitted in the narrow angle directions can have a luminous intensity higher than a luminous intensity of the light emitted in the wide angle directions.

The relatively high luminous intensity light emitted from the first semiconductor light-emitting device 12A in the narrow angle directions with respect to the element optical axis $AX_{12a}$ of the first semiconductor light-emitting device 12A (for example, light within ±25° in FIG. 6) can pass through the first lens 11A and be projected both in an upward direction and in a downward direction with respect to a horizontal plane. This can be caused by the action of the first lens 11A such that the image of the first semiconductor light-emitting device 12A is enlarged and reversed.

A DRL-dedicated first light distribution pattern P1 that extends above and below the horizontal line H-H and in the horizontal direction can thereby be formed as shown on the virtual vertical screen (which is, for example, disposed about 25 m ahead of the front end of the vehicle), as in FIG. 7A. For example, the first lens 11A can be appropriately designed so that the DRL-dedicated first light distribution pattern P1 extends above and below the horizontal line H-H by 10 degrees each and in the horizontal direction.

In this configuration, the luminous intensity of light through the first lens 11A can be, for example, 300 [cd] due to the effect of light projected in the directions above the horizontal plane from the first lens 11A (for example, above the horizontal line H-H ranging from 0 degrees to 10 degrees) when the first lens 11A is viewed from a viewpoint E in front of the vehicle (a viewpoint above the horizontal line H-H ranging from 0 degrees to 10 degrees, for example, the viewpoint of a pedestrian in front of the vehicle or the driver of an oncoming vehicle).

On the other hand, the relatively low luminous intensity light emitted from the first semiconductor light-emitting device 12A in the wide angle directions with respect to the element optical axis $AX_{12a}$ of the first semiconductor light-emitting device 12A (for example, light outside ±25° in FIG. 6) can be reflected by the first reflector 13 and the second reflector 14 and then pass through the second lens 11B to be projected forward.

The first reflector 13 and the second reflector 14 can be configured as follows in order to project the relatively low luminous intensity light passing through the second lens 11B only or substantially only in directions above the horizontal plane.

As shown in FIG. 4, the first reflector 13 can be disposed in a diagonally forward and downward direction with respect to the first semiconductor light-emitting device 12A so that the relatively low luminous intensity light emitted from the first semiconductor light-emitting device 12A in the wide angle directions with respect to the element optical axis $AX_{12a}$ of the first semiconductor light-emitting device 12A (for example, light outside ±25° in FIG. 6) can be incident on the first reflector 13.

The first reflector 13 can be a parabolic reflector (for example, a revolved parabolic surface or a free curved surface similar thereto) that has a focal point $F_{13}$ at or near (i.e., substantially at) the first semiconductor light-emitting device 12A. The optical axis $AX_{13}$ of the first reflector 13 can pass through the first semiconductor light-emitting device 12A and be slightly inclined with respect to the horizontal plane such that the axis $AX_{13}$ is lower on the rear side of the vehicle than on the front side.

The length of the first reflector 13 can be designed so that the first reflector 13 has an upper end 13a that does not block the light emitted from the first semiconductor light-emitting device 12A and entering the first lens 11A and a lower end 13b that does not block the light reflected from the third reflector 15 and entering the second lens 11B.

The first reflector 13 and the upper reflector 20 can be configured as a single member and formed by subjecting a reflector base material molded integrally using a mold to mirror finish processing such as vapor deposition of aluminum. This allows a reduction in the number of components, simplification of the step of attaching the first reflector 13 and the upper reflector 20, a reduction in attachment errors of the first reflector 13 and the upper reflector 20, etc., as compared to the case where the first reflector 13 and the upper reflector 20 are configured as independent components. Alternatively, the first reflector 13 and the upper reflector 20 may not be molded integrally but may be configured as independent components according to intended applications.

The relatively low luminous intensity light emitted from the first semiconductor light-emitting device 12A and incident on the first reflector 13 with the above configuration can be reflected by the first reflector 13 along its optical axis $AX_{13}$ obliquely rearward and downward.

The second reflector 14 can be disposed in an obliquely rearward and downward direction with respect to the first reflector 13 so that the relatively low luminous intensity light reflected by the first reflector 13 obliquely rearward and downward can be incident on the second reflector 14.

The second reflector 14 can be a planar mirror extending from the vehicle rear-side focal point $F_{11B}$ of the second lens 11B to a position obliquely forward and downward and disposed below the second optical axis $AX_{11B}$.

The second reflector 14 can be inclined at a tilt angle α with respect to the horizontal plane in a range of 45 degrees or smaller and an angle at which the second reflector 14 does not block the light reflected from the third reflector 15 and incident on the second lens 11B.

The relatively low luminous intensity light reflected from the first reflector 13 and incident on the second reflector 14 with the above configuration can be reflected by the second reflector 14 in an obliquely forward and downward direction, pass through the second lens 11B and be projected in the upward direction with respect to the horizontal plane. This can be caused by the action of the second lens 11B such that the image of the second reflector 14 is enlarged and reversed.

Figure 7A:
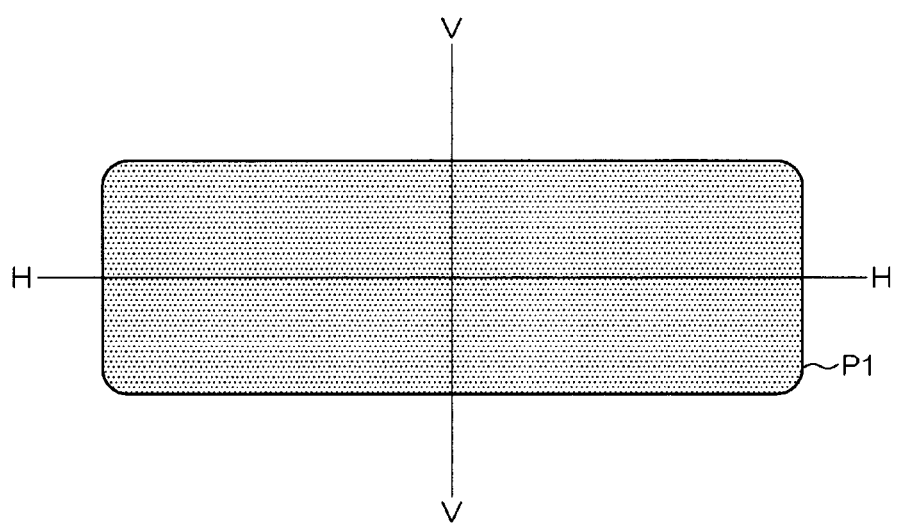
FIG. 7A shows an example of, when the first semiconductor light-emitting device is turned on, a first light distribution pattern P1 that is formed by light emitted from the first semiconductor light-emitting device through a first lens.
Figure 7B:
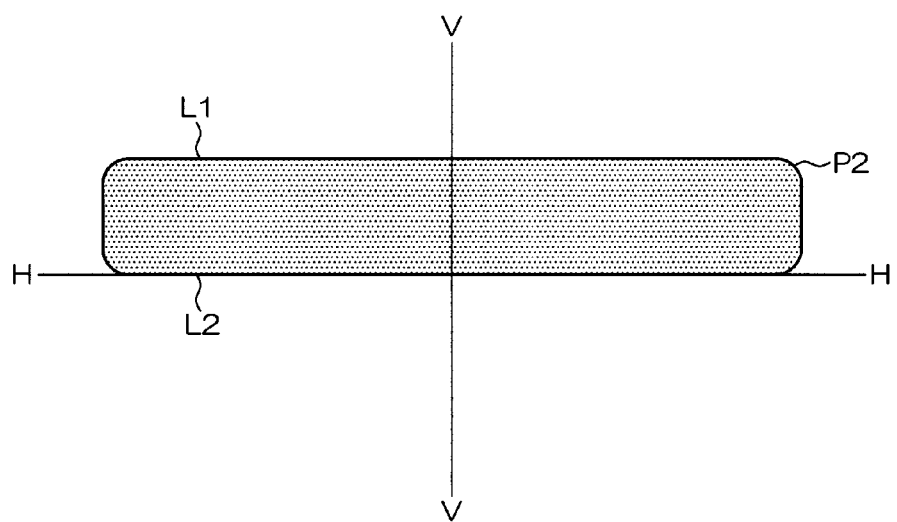
FIG. 7B shows an example of a second light distribution pattern P2 that is formed by light emitted from the first semiconductor light-emitting device through a second lens.

A second light distribution pattern P2 that extends above the horizontal line H-H and in the horizontal direction can thereby be formed as shown on the virtual vertical screen (which is, for example, disposed about 25 m ahead of the front end of the vehicle), as in FIG. 7B.

The upper edge L1 of the second light distribution pattern P2 can correspond to the front edge 14a of the second reflector 14 and the lower edge L2 thereof can correspond to the rear edge 14b thereof. Therefore, the adjustment of the length of the second reflector 14 can control the vertical width of the second light distribution pattern P2. For example, the length of the second reflector 14 can be adjusted properly, so that the uppermost edge L1 of the second light distribution pattern P2 can be positioned at the position of 10 degrees above the horizontal line H-H while the lowermost edge L2 thereof can be positioned on the horizontal line H-H.

In this case, the luminous intensity of the light from the second lens 11B when it is viewed from a certain viewpoint E in front of the vehicle can be 300 [cd] due to the effect of light projected from the second lens 11B in an upward direction with respect to the horizontal plane, whereby the second lens 11B can be recognized to shine.

As described above, although the light passing through the second lens 11B is relatively low luminous intensity light, the action of the first reflector 13 and the second reflector 14 can direct the relatively low luminous intensity light passing through the second lens 11B to the upper direction with respect to the horizontal plane (for example, ranging from 0 degrees to 10 degrees above the horizontal line H-H).

Figure 8:
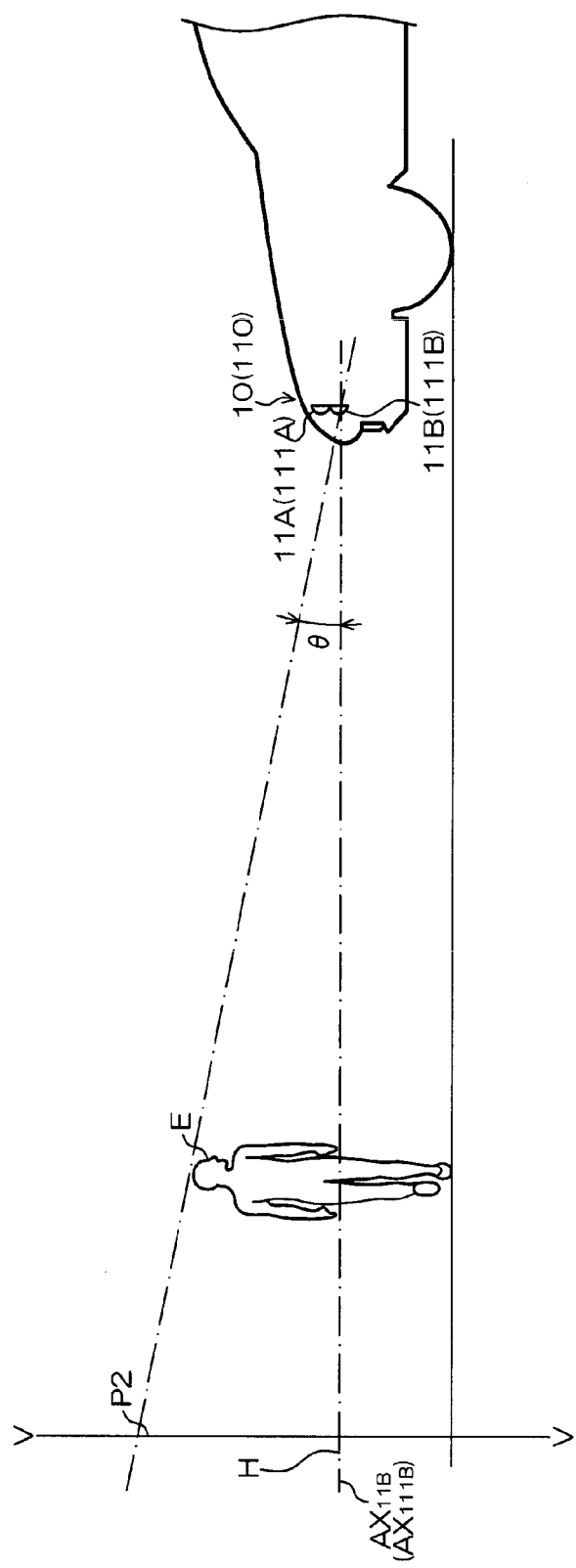
FIG. 8 is a diagram illustrating an example that allows brightnesses observed through first and second lenses of the vehicle lighting unit of FIG. 2 to match (or substantially match)

This allows the luminous intensity of the light from the first lens 11A and that from the second lens 11B to match (or substantially match) when they are viewed from a certain viewpoint E in front of the vehicle (a certain viewpoint ranging from 0 degrees to 10 degrees above the horizontal line H-H, for example, the viewpoint of a pedestrian in front of the vehicle or the driver of an oncoming vehicle, see FIG. 8). (For example, the luminous intensities are 300 [cd].) In this manner, the brightnesses observed through the first and second lenses 11A and 11B are allowed to match (or substantially match) when they are viewed from a certain viewpoint E in front of the vehicle.

Note that when an actual viewpoint is shifted forward or rearward, as the distance between the viewpoint E and the shifted viewpoint becomes larger, the difference between the luminous intensities (difference in luminance) of the light from one lens (for example, the first lens 11A) and the other lens (for example, the second lens 11b) becomes larger when they are viewed from the shifted viewpoint. In this case, however, it is considered that the brightnesses of the respective lenses 11A and 11B are not remarkably varied.

Next, a description will be given of the method of adjusting the luminous intensity of the second lens 11B when it is viewed from the certain viewpoint E in front of the vehicle body.

For example, a concave or hollow reflector (or a free curved surface etc. similar thereto) facing the second lens 11B can be used as the second reflector 14 to diffuse the light passing through the second lens 11B vertically and/or horizontally. In this manner, the luminous intensity (luminance) of light through the second lens 11B can be adjusted when the lens is viewed from a viewpoint in front of the vehicle (a viewpoint above the horizontal line H-H). Alternatively, if the vertical length and/or the surface shape of the first reflector 13 is adjusted, the luminous intensity (luminance) of light through the second lens 11B can also be adjusted when the lens is viewed from a viewpoint in front of the vehicle (a viewpoint above the horizontal line H-H).

This allows the luminous intensity of the light from the first lens 11A and that from the second lens 11B to match more close to each other (or substantially match) when they are viewed from a certain viewpoint E in front of the vehicle (a certain viewpoint ranging from 0 degrees to 10 degrees above the horizontal line H-H, for example, the viewpoint of a pedestrian in front of the vehicle or the driver of an oncoming vehicle, see FIG. 8). (For example, the luminous intensities are 300 [cd].) In this manner, the brightnesses observed through the first and second lenses 11A and 11B are allowed to match more close to each other (or substantially match) when they are viewed from the certain viewpoint E in front of the vehicle.

Next, a description will be given of an optical system configured to form a low-beam light distribution.

The optical system can include the second lens 11B, the second semiconductor light-emitting device 12B, the shade 16, and the like.

Figure 5B:
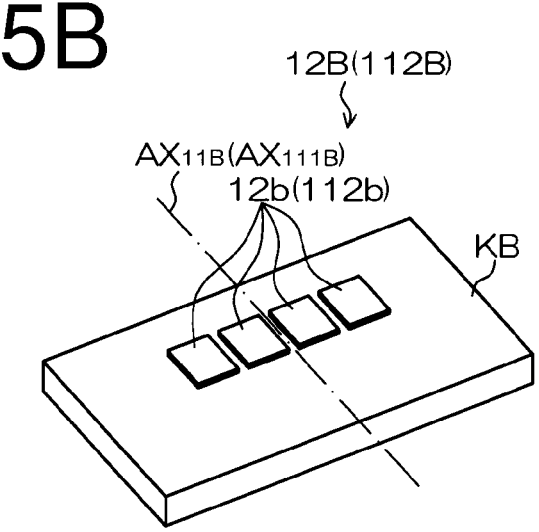

FIG. 5B is a perspective view of the second semiconductor light-emitting device 12B.

The second semiconductor light-emitting device 12B can be, for example, a single light source in which a plurality of LED chips 12b (for example, four 1 mm-square blue LED chips) are packaged. Each of the LED chips 12b may be covered with a phosphor (for example, a YAG phosphor (a yellow phosphor)). The number of LED chips 12b is not limited to 4 and may be 1 to 3 or 5 or more. Each of the LED chips 12b can provide higher luminance than each of the LED chips 12a in order to form the low-beam light distribution pattern which is required to be brighter than the DRL-dedicated light distribution pattern.

The respective LED chips 12b can be mounted on a substrate KB secured to the upper surface 19a of the heat sink 19 such that light is emitted substantially upward (in the illustrated example, the light is emitted in a diagonally rearward and upward direction shown in FIG. 4). The LED chips 12a can be disposed on the rear side of the vehicle rear-side focal point $F_{11B}$ of the second lens 11B and placed at or near (i.e., substantially at) the second optical axis $AX_{11B}$. As shown in FIG. 5B, the LED chips 12b can be arranged in a row (in a direction perpendicular to the sheet of FIG. 4) at predetermined intervals with their edges along a horizontal line orthogonal to the second optical axis $AX_{11B}$ so as to be symmetric with respect to the second optical axis $AX_{11B}$.

The substrate KB can be disposed so as to be inclined with respect to the horizontal plane with the vehicle front end side KBa of the substrate KB being higher than its vehicle rear end side KBb (see FIG. 4). Therefore, the element optical axes $AX_{12b}$ of the LED chips 12b can be diagonally rearward and upward. It should be appreciated that the substrate KB may be disposed horizontally such that the vehicle front end side KBa and the vehicle rear end side KBb are on the same horizontal plane.

A power cable can be electrically connected between the second semiconductor light-emitting device 12B and a not-shown lighting circuit, which can supply the second semiconductor light-emitting device 12B with a constant current, thereby performing turning-on/turning-off control. Heat generated from the second semiconductor light-emitting device 12B can be dissipated by the action of the heat sink 19.

The second semiconductor light-emitting device 12B is not limited to include the LED chips 12b so long as it is a light source device including surface light-emitting chips used substantially as point light-emitting chips. For example, the second semiconductor light-emitting device 12B may include light-emitting diodes or laser diodes other than LED chips.

As shown in FIG. 4, the third reflector 15 can be a revolved ellipsoidal reflector (for example, a revolved ellipsoidal surface or a free curved surface similar thereto) that has a first focal point $F1_{15}$ at or near (i.e., substantially at) the second semiconductor light-emitting device 12B and a second focal point $F2_{15}$ at or near (i.e., substantially at) the vehicle rear-side focal point $F_{11B}$ of the second lens 11B.

The third reflector 15 can extend from one side of the second semiconductor light-emitting device 12B (from the vehicle rear side in FIG. 4) toward the second lens 11B and cover the second semiconductor light-emitting device 12B from above. The third reflector 15 can be designed such that relatively high luminous intensity light emitted substantially upward from the second semiconductor light-emitting device 12B in narrow angle directions with respect to the element optical axis $AX_{12b}$ of the second semiconductor light-emitting device 12B (for example, light within about the half value angles (namely, light within ±60° in FIG. 6)) can be incident on the third reflector 15.

Figure 9:
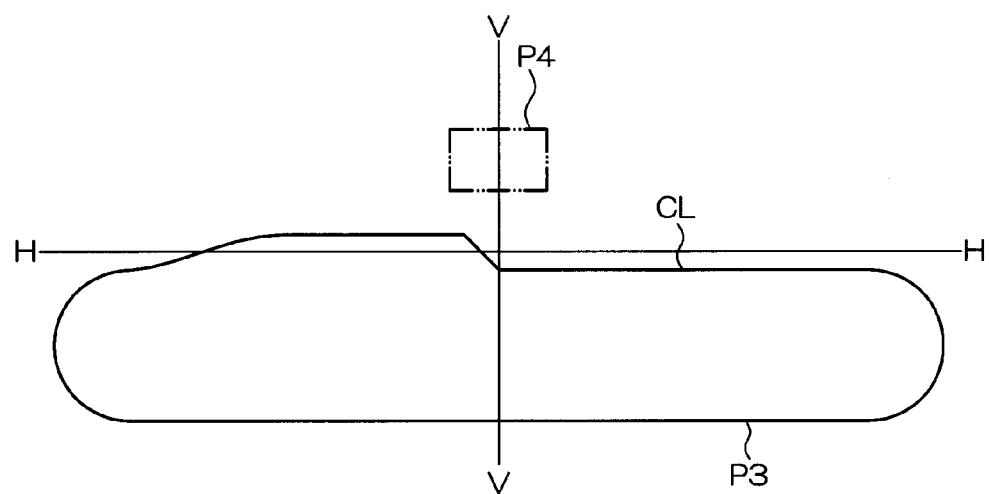
FIG. 9 shows an example of a low-beam distribution pattern P3 and an overhead sign light distribution pattern P4 that are formed by light emitted through the second lens when the second semiconductor light-emitting device is turned on of the vehicle lighting unit of FIG. 2.

The shade 16 can include a minor surface 16a extending from the vehicle rear-side focal point $F_{11B}$ of the second lens 11B toward the second semiconductor light-emitting device 12B. The front edge of the shade 16 can be curved and concaved along a plane that includes the vehicle rear-side focal point of the second lens 11B. The light incident on the minor surface 16a and reflected upward can be refracted by the second lens 11B and directed toward a road surface. More specifically, the light incident on the minor surface 16a can change its travelling direction so as to be directed below a cut-off line and is superposed onto a light distribution pattern below the cut-off line. In this manner, a low-beam light distribution pattern P3 including the cut-off line CL can be formed as shown in FIG. 9.

The second reflector 14 and the shade 16 can be configured as a single member and formed by subjecting a base material molded integrally using a mold to minor finish processing such as vapor deposition of aluminum. This allows a reduction in the number of components, simplification of the step of attaching the second reflector 14 and the shade 16, a reduction in attachment errors of the second reflector 14 and the shade 16, etc., as compared to the case where the second reflector 14 and the shade 16 are configured as independent components. The second reflector 14 and the shade 16 may not be molded integrally but may be configured as independent components according to intended applications.

Next, a description will be given of an optical system configured to form an overhead sign light distribution pattern.

The optical system can include the second lens 11B, the second semiconductor light-emitting device 12B, the fourth reflector 17, the fifth reflector 18, and the like.

The fourth reflector 17 can be disposed between the second lens 11B and the third reflector 15. The fourth reflector 17 can be designed such that relatively low luminous intensity light emitted substantially upward from the second semiconductor light-emitting device 12B in wide angle directions with respect to the element optical axis $AX_{12b}$ of the second semiconductor light-emitting device 12B (for example, light near the half value angles or outside the angles (namely, light outside ±60° in FIG. 6)) is incident on the second reflector 15. It should be noted that the light emitted in the narrow angle directions and incident on the first reflector can have a luminous intensity higher than luminous intensity of the light emitted in the wide angle directions and incident on the second reflector.

The fourth reflector 17 can be a planar mirror disposed so as to be inclined with respect to the horizontal plane with the vehicle front end side 17a of the reflector 17 being lower than its vehicle rear end side 17b.

The third reflector 15 and the fourth reflector 17 can be configured as a single member and formed by subjecting a base material molded integrally using a mold to mirror finish processing such as vapor deposition of aluminum. This allows a reduction in the number of components, simplification of the step of attaching the third reflector 15 and the fourth reflector 17, a reduction in attachment errors of the third reflector 15 and the fourth reflector 17, etc., as compared to the case where the third reflector 15 and the fourth reflector 17 are configured as independent components. Alternatively, the third reflector 15 and the fourth reflector 17 may not be molded integrally but may be configured as independent components according to intended applications.

The fifth reflector 18 can be disposed in an obliquely forward and downward position with respect to the fourth reflector 17 so that the light reflected by the fourth reflector 17 in an obliquely forward and downward direction can be incident on the fifth reflector 18. In the present exemplary embodiment, the fifth reflector 18 can be part of the second reflector 14 at or near (i.e., substantially at) the focal point $F_{11B}$ of the second lens 11B.

The fifth reflector 18 can be inclined in order to reflect light from the fourth reflector 17 and cause the reflected light to pass through the second lens 11B and be projected in a direction upward with respect to the horizontal plane by a predetermined angle (for example, in the range of 2° to 4° above the horizontal line), thereby illuminating the overhead sign region A on the virtual vertical screen (which is, for example, disposed about 25 m ahead of the front end of the vehicle) with the light. The overhead sign region A means a region that is on a virtual vertical screen disposed about 25 m ahead of the front end of the vehicle, is located above the horizontal line, and subtends 2° to 4°, and where a road guide, a road sign, etc. is present (see FIG. 9).

Next, a description will be given of the operation example of the vehicle lighting unit 10 with the above configuration.

When a switch (not shown) connected to the not-shown lighting circuit is caused to select a DRL scheme, the lighting circuit can supply the first semiconductor light-emitting device 12A with a constant current I1, thereby turning on the first semiconductor light-emitting device 12A (while the second semiconductor light-emitting device 12B is still turned off).

In this case, the light emitted from the first semiconductor light-emitting device 12A can pass the following optical path.

First, relatively high luminous intensity light emitted from the first semiconductor light-emitting device 12A in narrow angle directions with respect to the element optical axis $AX_{12a}$ of the first semiconductor light-emitting device 12A (for example, light within ±25° in FIG. 6)) can be allowed to pass through the first lens 11A and projected in directions upward and downward with respect to the horizontal plane (for example, in an angle range of 10 degrees upward to 10 degrees downward with respect to the horizontal line H-H).

In this manner, as shown in FIG. 7A, the first light distribution pattern P1 that is suitable for the DRL-dedicated light distribution pattern and extends horizontally wide and vertically limited (for example, in an angle range of 10 degrees upward to 10 degrees downward with respect to the horizontal line H-H) can be formed on a virtual vertical screen (disposed about 25 m ahead of the front end of the vehicle).

On the other hand, relatively low luminous intensity light emitted from the first semiconductor light-emitting device 12A in wide angle directions with respect to the element optical axis $AX_{12a}$ of the first semiconductor light-emitting device 12A (for example, light outside ±25° in FIG. 6)) can be reflected by the first reflector 13 and the second reflector 14 and allowed to pass through the second lens 11B and projected in directions upward with respect to the horizontal plane (for example, in an angle range of 0 degrees to 10 degrees above the horizontal line H-H).

In this manner, as shown in FIG. 7A, the second light distribution pattern P2 that extends horizontally wide and vertically limited (for example, in an angle range of 0 degrees to 10 degrees above the horizontal line H-H) can be formed on the virtual vertical screen (disposed about 25 m ahead of the front end of the vehicle).

In this manner, the first light distribution pattern P1 and the second light distribution pattern P2 can be superposed upon each other to form a synthesized light distribution pattern suitable for the DRL-dedicated light distribution pattern.

In the above configuration, the light allowed to pass through the second lens 11B may be mainly the relatively low luminous intensity light, and the action of the first reflector 13 and the second reflector 14 can project the light passing through the second lens 11B only or substantially only in upward directions with respect to the horizontal plane (for example, in a range of 0 degrees to 10 degrees above the horizontal line H-H).

This allows the luminous intensity of the light from the first lens 11A and that from the second lens 11B to match (or substantially match) when they are viewed from a certain viewpoint E in front of the vehicle (a certain viewpoint ranging from 0 degrees to 10 degrees above the horizontal line H-H, for example, the viewpoint of a pedestrian in front of the vehicle or the driver of an oncoming vehicle, see FIG. 8). In this manner, the brightnesses observed through the first and second lenses 11A and 11B can be allowed to match (or substantially match) when they are viewed from the certain viewpoint E in front of the vehicle.

When the not-shown switch connected to the not-shown lighting circuit is caused to select low-beam light projection, the lighting circuit can supply the first semiconductor light-emitting device 12A with another constant current I2 (lower than the DRL constant current I1) and the second semiconductor light-emitting device 12B with a constant current I3, thereby turning on the first semiconductor light-emitting device 12A and the second semiconductor light-emitting device 12B. It should be noted that in this case, the first semiconductor light-emitting device 12A is turned on with reduced light emission (as compared with the DRL scheme).

In this case, the light emitted from the first semiconductor light-emitting device 12A can pass the same optical path as that in the DRL scheme. This can form a light distribution pattern that is suitable for the positioning light distribution pattern and that extends horizontally wide and vertically limited on a virtual vertical screen (disposed about 25 m ahead of the front end of the vehicle).

On the other hand, the second semiconductor light-emitting device 12B can pass the following optical path.

Specifically, the light emitted from the second semiconductor light-emitting device 12B and being incident on the third reflector 15 can be reflected by the third reflector 15 and focused on or near the vehicle rear-side focal point $F_{11B}$ of the second lens 11B, and then pass through the second lens 11B to be projected forward. In this manner, as shown in FIG. 9, the low beam light distribution pattern P3 including the cut-off line CL can be formed on a virtual vertical screen (disposed, for example, about 25 m ahead of the front end of the vehicle).

On the other hand, light emitted from the second semiconductor light-emitting device 12B and being incident on the fourth reflector 17 can be reflected by the fourth reflector 17 and the fifth reflector 18 and allowed to pass through the second lens 11B and projected in directions upward with respect to the horizontal plane (for example, in an angle range of 2 degrees to 4 degrees above the horizontal line, for example). In this manner, the overhead sign light distribution pattern P4 can thereby be formed in the overhead sign region A on the virtual vertical screen (which is, for example, disposed about 25 m ahead of the front end of the vehicle), as shown in FIG. 9.

The optical axes of the vehicle lighting unit 10 have been adjusted using well-known aiming mechanisms (not shown) such that the respective light distribution patterns P1 to P4 are projected onto proper regions on the virtual vertical screen.

As described above, according to the vehicle lighting unit 10 of the present exemplary embodiment, the light allowed to pass through the second lens 11B may be mainly the relatively low luminous intensity light, and the action of the first reflector 13 and the second reflector 14 can project the relatively low luminous intensity light passing through the second lens 11B only or substantially only in upward directions with respect to the horizontal plane (for example, in a range of 0 degrees to 10 degrees above the horizontal line H-H).

This allows the luminous intensity of the light from the first lens 11A and that from the second lens 11B to match (or substantially match) when they are viewed from a certain viewpoint E in front of the vehicle (a viewpoint ranging from 0 degrees to 10 degrees above the horizontal line H-H, for example, the viewpoint of a pedestrian in front of the vehicle or the driver of an oncoming vehicle, see FIG. 8). In this manner, the brightnesses observed through the first lens 11A and the second lens 11B can be allowed to match (or substantially match) when they are viewed from the certain viewpoint E in front of the vehicle.

In addition, the vehicle lighting unit 10 of the present exemplary embodiment can turn the first semiconductor light-emitting device 12A ON and the second semiconductor light-emitting device 12B OFF, thereby serving as a daytime running lamp (DRL), as shown in FIGS. 7A and 7B. On the contrary the vehicle lighting unit 10 can turn the first semiconductor light-emitting device 12A ON with reduced light emission and the second semiconductor light-emitting device 12B ON, thereby serving as a vehicle headlamp for forming a low beam light distribution pattern P3 and also as a positioning lamp, as shown in FIG. 9.

With the above configuration, the vehicle lighting unit 10 of the present exemplary embodiment can serve as a multifunctional combination vehicle lighting unit 10 having combined functions of a DRL type lamp and a vehicle headlamp for forming a low beam light distribution pattern (also serving as a positioning lamp).

Further, in the vehicle lighting unit 10 of the present exemplary embodiment, the distance between the first lens 11A at its lower edge and the second lens 11B at its upper edge in the vertical direction can be 15 mm or less. In the vehicle lighting unit configured as above, the first lens 11A and the second lens 11B can be visually recognized as a single light-emitting region.

Second Exemplary Embodiment

A description will now be made below to a vehicle lighting unit of a second exemplary embodiment with reference to the accompanying drawings.

The vehicle lighting unit 110 of the present exemplary embodiment made in accordance with the principles of the presently disclosed subject matter can form a high-beam light distribution pattern and a low-beam light distribution pattern. At least one vehicle lighting unit 110 of the present exemplary embodiment can be disposed on each of the front left and right sides of a vehicle body such as an automobile.

Figure 10:
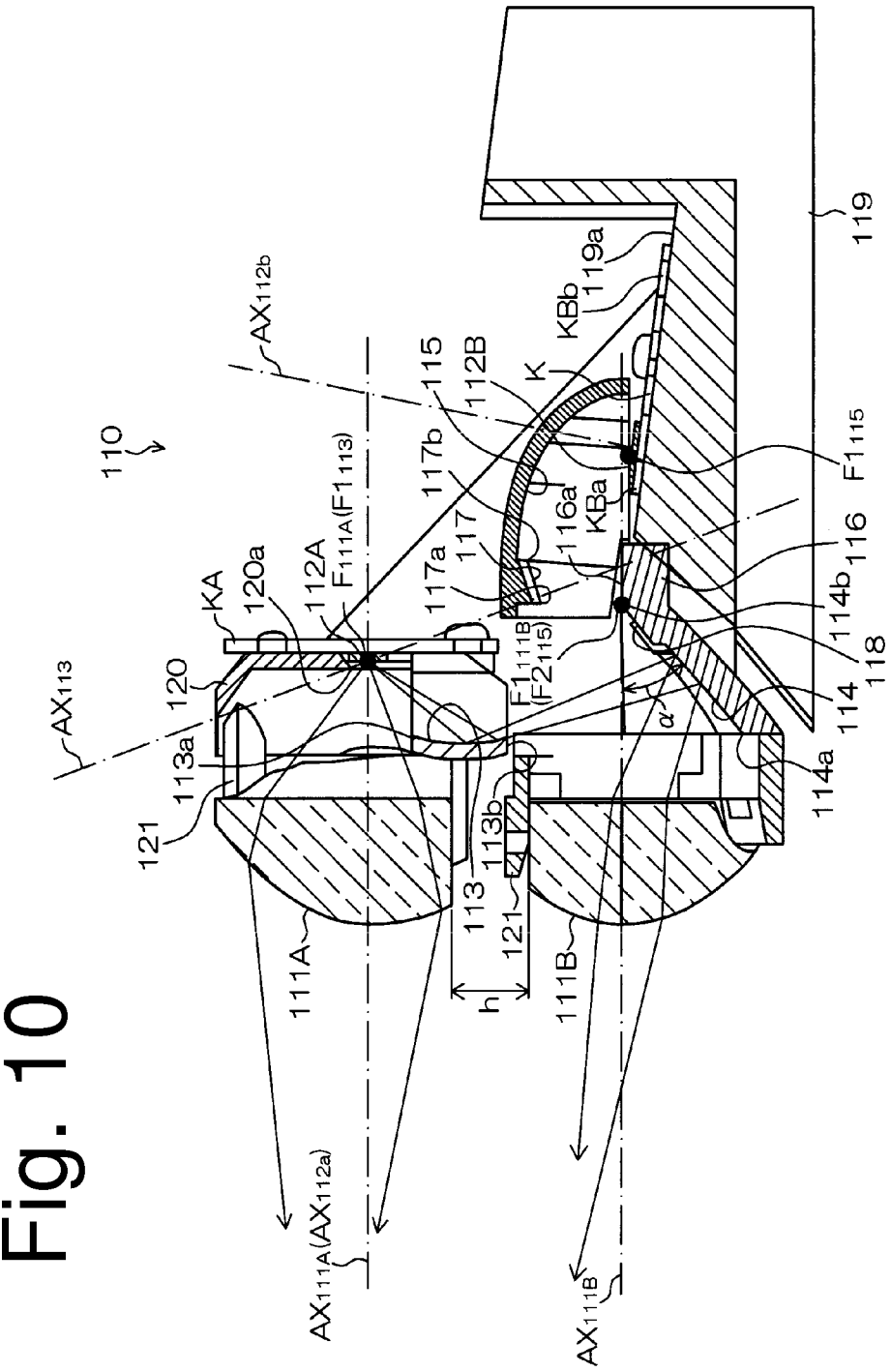
FIG. 10 is a vertical cross-sectional view of a vehicle lighting unit taken along a vertical plane including a first optical axis $AX_{111A}$ and a second optical axis $AX_{111B}$ according to a second exemplary embodiment made in accordance with principles of the presently disclosed subject matter.

FIG. 10 is a vertical cross-sectional view of the vehicle lighting unit 110 taken along a vertical plane including a first optical axis $AX_{111A}$ and a second optical axis $AX_{111B}$ of the vehicle lighting unit 110.

As shown in FIG. 9, the vehicle lighting unit 110 can include: a first lens 111A having a focal point $F_{111A}$ on a vehicle rear-side; a second lens 111B disposed below the first lens 111A and having a focal point $F_{111B}$ on the vehicle rear-side; a first semiconductor light-emitting device 112A disposed at or near (i.e., substantially at) the vehicle rear-side focal point $F_{111A}$ of the first lens 111A; a second semiconductor light-emitting device 112B disposed on the rear side of the vehicle rear-side focal point $F_{111B}$ of the second lens 111B and positioned near the second optical axis $AX_{111B}$; a first reflector 113 disposed diagonally forward and downward with respect to the first semiconductor light-emitting device 112A; a second reflector 114 disposed diagonally rearward and downward with respect to the first reflector 113; a third reflector 115 disposed above the second semiconductor light-emitting device 112B; a shade 116 disposed between the second lens 111B and the second semiconductor light-emitting device 112B and configured to block part of the light emitted from the second semiconductor light-emitting device 112B and reflected by the third reflector 115; a fourth reflector 117 disposed between the second lens 111B and the third reflector 115; a fifth reflector 118 disposed obliquely forward and downward with respect to the fourth reflector 117; a heat sink 119; an upper reflector 120; a lens holder 121; a decoration member 122; etc.

As shown in FIG. 10, the first lens 111A can be held by the lens holder 121 secured to the heat sink 119 (or the upper reflector 120 or the like) and be disposed on the upper first optical axis $AX_{111A}$ extending in the front-rear direction of the vehicle. Similarly, the second lens 111B can be held by the lens holder 121, be disposed on the lower second optical axis $AX_{111B}$ extending in the front-rear direction of the vehicle, and be placed at a position below the first lens 111A with a separation distance h therefrom. The distance h is desirably 15 [mm] or less (for example, 10 [mm]). With this configuration, the first lens 111A and the second lens 111B can be visually recognized as a single light-emitting region.

The respective optical axes $AX_{111A}$ and $AX_{111B}$ are contained in a single vertical plane and extend in a substantially horizontal direction. Therefore, the respective lenses 111A and 111B can be visually recognized such that they are arranged in a vertical direction and directed in the same direction. The second optical axis $AX_{111B}$ may be slightly inclined with respect to a horizontal plane such that the axis $AX_{111B}$ is higher (or lower) on the front side of the vehicle than on the rear side. In this case, the respective lenses 111A and 111B can be visually recognized such that they are arranged vertically and directed in different directions. The respective optical axes $AX_{111A}$ and $AX_{111B}$ may not be contained in a single vertical plane but may be contained in different vertical planes. In this case, the respective lenses 111A and 111B can be visually recognized such that they are arranged in a vertically diagonal direction.

Each of the lenses 111A and 111B can be, for example, a plano-convex aspherical projection lens having a convex surface on the front side thereof and a flat surface on the rear side thereof. The first lens 111A and the second lens 111B can be formed as projection lenses having the same shape, the same size, and the same focal length. However, the first lens 111A and the second lens 111B may be formed as projection lenses having different shapes, different sizes, and different focal lengths.

In the present exemplary embodiment, each of the lenses 111A and 111B can have an outer circumference cut into a hexagonal shape as viewed from the front (see FIG. 3). The respective lenses 111A and 111B may be projection lenses having circular, ellipsoidal, or n-sided polygonal (n is an integer of 3 or larger) shapes or other shapes.

The first lens 111A and the second lens 111B can be molded by injecting a transparent resin (such as an acrylic resin or polycarbonate) into a mold and cooling the resin to solidify it. Note the first lens 111A and the second lens 111B can be integrally molded, so that they can be configured as a single member. This allows a reduction in the number of components, simplification of the step of attaching the respective lenses 111A and 111B, a reduction in attachment errors of the respective lenses 111A and 111B, etc. as compared to the case where the first lens 111A and the second lens 111B are configured as independent components.

A space h extending horizontally (in a direction perpendicular to the sheet of FIG. 10) can be formed between the lower end of the first lens 111A and the upper end of the second lens 111B. The decoration member 122 extending horizontally can be disposed in the space h (see FIG. 3). The surface of the decoration member 122 may have been subjected to minor finish processing such as vapor deposition of aluminum. The decoration member 122 can be secured to the space h by well-known attaching means such as bonding or fitting. The height of the decoration member 122 may be equal to or less than the distance h (for example, 10 [mm]).

A description will next be given of an optical system for forming a high-beam light distribution pattern.

The optical system can include the first lens 111A, the second lens 111B, the first semiconductor light-emitting device 112A, the first reflector 113, and the second reflector 114.

FIG. 5A is a perspective view of the first semiconductor light-emitting device 112A.

The first semiconductor light-emitting device 112A can be, for example, a single light source in which a plurality of LED chips 112a (for example, four 1 mm-square blue LED chips) are packaged. Each of the LED chips 112a may be covered with a phosphor (for example, a YAG phosphor (a yellow phosphor)). The number of LED chips 112a is not limited to 4 and may be 1 to 3 or 5 or more. Each of the LED chips 112a can provide high luminance in order to form the high-beam light distribution pattern which is required to be a brighter pattern.

The LED chips 112a can be mounted on a first substrate KA secured to the upper reflector 120 such that the light emission surface $112_{a1}$ is directed forward of the vehicle body. Furthermore, the LED chips 112a can be disposed at or near (i.e., substantially at) the vehicle rear-side focal point $F_{111A}$ of the first lens 111A. Each of the LED chips 112a can have an optical axis $AX_{112a}$ that extends in the substantially same direction as the first optical axis $AX_{111A}$. The upper reflector 120 can have an opening 120a, through which the respective LED chips 112a are exposed. The respective LED chips 112a can be arranged in a row (in a direction perpendicular to the sheet of FIG. 10) at predetermined intervals with their edges along a horizontal line orthogonal to the first optical axis $AX_{111A}$ so as to be symmetric with respect to the first optical axis $AX_{111A}$. (See FIG. 5A.)

A power cable can be electrically connected between the first semiconductor light-emitting device 112A and a not-shown lighting circuit, which can supply the first semiconductor light-emitting device 112A with a constant current, thereby performing turning-on/turning-off control.

FIG. 6 shows an example of the directional characteristics of one of the LED chips 112a in the first semiconductor light-emitting device 112A. It should be noted that the directional characteristics of one of the LED chips 112b in the second semiconductor light-emitting device 112B can be the same as that of the first semiconductor light-emitting device 112A.

The directional characteristics mean the ratio of the luminous intensity in a direction inclined at a given angle with respect to the element optical axis $AX_{112a}$ of the LED chip 112a in the semiconductor light-emitting device with the luminous intensity on the element optical axis $AX_{112a}$ of the LED chip 112a being set to 100%. The directional characteristics represent the spread of light emitted from the LED chip 112a in the semiconductor light-emitting device 112. The angle at which the ratio of luminous intensity is 50% is a half-value angle. In FIG. 6, the half-value angle is ±60°.

The first semiconductor light-emitting device 112A is not limited to include the LED chips 112a so long as it is a light source device including surface light-emitting chips used substantially as point light-emitting chips. For example, the first semiconductor light-emitting device 112A may include light-emitting diodes or laser diodes other than LED chips.

Relatively high luminous intensity light emitted from the first semiconductor light-emitting device 112A in narrow angle directions with respect to the element optical axis $AX_{112a}$ of the first semiconductor light-emitting device 112A (for example, light within ±25° in FIG. 6) and relatively low luminous intensity light emitted in wide angle directions with respect to the element optical axis $AX_{112a}$ (for example, light outside ±25° in FIG. 6) can travel along the following optical paths. It should be noted that the light emitted in the narrow angle directions can have a luminous intensity higher than the light emitted in the wide angle directions does.

The relatively high luminous intensity light emitted from the first semiconductor light-emitting device 112A in the narrow angle directions with respect to the element optical axis $AX_{112a}$ of the first semiconductor light-emitting device 112A (for example, light within ±25° in FIG. 6) can pass through the first lens 111A and be projected both in an upward direction and in a downward direction with respect to a horizontal plane. This can be caused by the action of the first lens 111A such that the image of the first semiconductor light-emitting device 112A is enlarged and reversed.

Figure 11A:
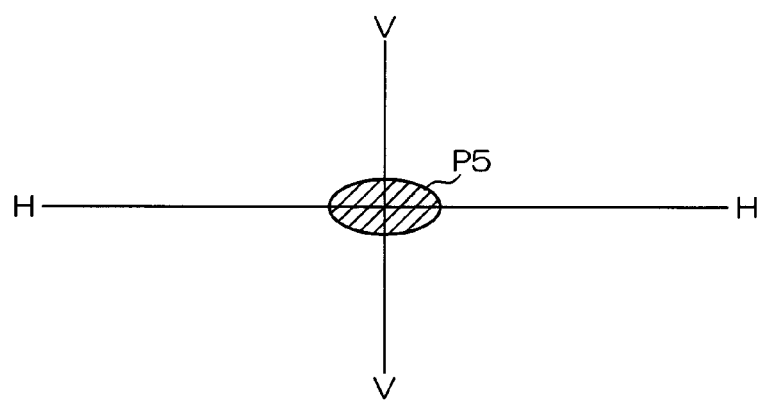
FIG. 11A shows an example of, when the first semiconductor light-emitting device of the vehicle lighting unit of FIG. 10 is turned on, a light distribution pattern P5 that is formed by light emitted from the first semiconductor light-emitting device through a first lens.

A light distribution pattern P5 that is suitable for a high-beam light distribution pattern and is a spot light projected in an area including the intersection of the horizontal line H-H and the vertical line V-V can thereby be formed as shown on the virtual vertical screen (which is, for example, disposed about 25 m ahead of the front end of the vehicle), as in FIG. 11A. For example, the first lens 111A can be appropriately designed so that the high beam light distribution pattern P5 being a spot light projected in an area including the intersection of the horizontal line H-H and the vertical line V-V can be formed.

In this configuration, the luminous intensity of light through the first lens 111A can be, for example, 300 [cd] due to the effect of light projected in the directions above the horizontal plane from the first lens 111A when the first lens 111A is viewed from a viewpoint E in front of the vehicle (a viewpoint above the horizontal line H-H, for example, the viewpoint of a pedestrian in front of the vehicle or the driver of an oncoming vehicle).

On the other hand, the relatively low luminous intensity light emitted from the first semiconductor light-emitting device 112A in the wide angle directions with respect to the element optical axis $AX_{112a}$ of the first semiconductor light-emitting device 112A (for example, light outside ±25° in FIG. 6) can be reflected by the first reflector 113 and the second reflector 114 and then pass through the second lens 111B to be projected forward.

The first reflector 113 and the second reflector 114 can be configured as follows in order to project the relatively low luminous intensity light passing through the second lens 111B only or substantially only in directions above the horizontal plane.

As shown in FIG. 10, the first reflector 113 can be disposed in a diagonally forward and downward direction with respect to the first semiconductor light-emitting device 112A so that the relatively low luminous intensity light emitted from the first semiconductor light-emitting device 112A in the wide angle directions with respect to the element optical axis $AX_{112a}$ of the first semiconductor light-emitting device 112A (for example, light outside ±25° in FIG. 6) can be incident on the first reflector 113.

The first reflector 113 can be a parabolic reflector (for example, a revolved parabolic surface or a free curved surface similar thereto) that has a focal point $F_{113}$ at or near (i.e., substantially at) the first semiconductor light-emitting device 112A. The optical axis $AX_{113}$ of the first reflector 113 can pass through the first semiconductor light-emitting device 112A and be slightly inclined with respect to the horizontal plane such that the axis $AX_{113}$ is lower on the rear side of the vehicle than on the front side.

The length of the first reflector 113 can be designed so that the first reflector 113 has an upper end 113a that does not block the light emitted from the first semiconductor light-emitting device 112A and entering the first lens 111A and a lower end 113b that does not block the light reflected from the third reflector 115 and entering the second lens 111B.

The first reflector 113 and the upper reflector 120 can be configured as a single member and formed by subjecting a reflector base material molded integrally using a mold to minor finish processing such as vapor deposition of aluminum. This allows a reduction in the number of components, simplification of the step of attaching the first reflector 113 and the upper reflector 120, a reduction in attachment errors of the first reflector 113 and the upper reflector 120, etc., as compared to the case where the first reflector 113 and the upper reflector 120 are configured as independent components. The first reflector 113 and the upper reflector 120 may not be molded integrally but may be configured as independent components according to intended applications.

The relatively low luminous intensity light emitted from the first semiconductor light-emitting device 112A and incident on the first reflector 113 with the above configuration can be reflected by the first reflector 113 along its optical axis $AX_{113}$ obliquely rearward and downward.

The second reflector 114 can be disposed in an obliquely rearward and downward direction with respect to the first reflector 113 so that the relatively low luminous intensity light reflected by the first reflector 113 obliquely rearward and downward can be incident on the second reflector 114.

The second reflector 114 can be a planar mirror extending from the vehicle rear-side focal point $F_{111B}$ of the second lens 111B to the position obliquely forward and downward and disposed below the second optical axis $AX_{111B}$.

The second reflector 114 can be inclined at a tilt angle α with respect to the horizontal plane in a range of 45 degrees or smaller and an angle at which the second reflector 114 does not block the light reflected from the third reflector 115 and incident on the second lens 111B.

The relatively low luminous intensity light reflected from the first reflector 113 and being incident on the second reflector 114 with the above configuration can be reflected by the second reflector 114 in an obliquely forward and downward direction, pass through the second lens 111B and be projected in the upward direction with respect to the horizontal plane. This can be caused by the action of the second lens 111B such that the image of the second reflector 114 is enlarged and reversed.

Figure 11B:
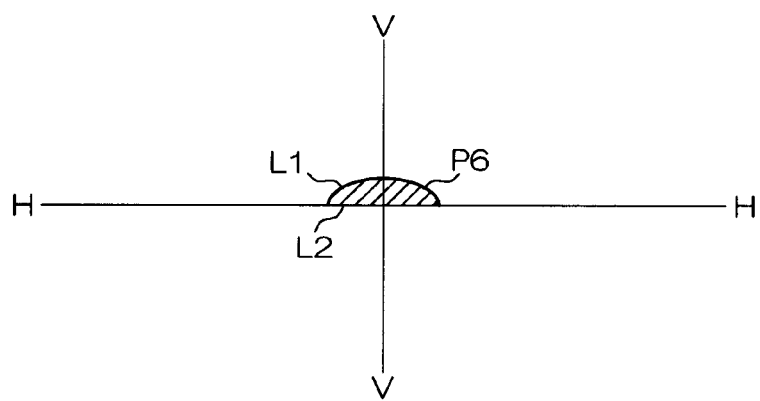
FIG. 11B shows an example of a light distribution pattern P6 that is formed by light emitted from the first semiconductor light-emitting device through a second lens of the vehicle lighting unit of FIG. 10.

A light distribution pattern P6 that is being a spot light projected in an area including the intersection of the horizontal line H-H and the vertical line V-V and above the horizontal line H-H can thereby be formed as shown on the virtual vertical screen (which is, for example, disposed about 25 m ahead of the front end of the vehicle), as in FIG. 11B.

The upper edge L1 of the light distribution pattern P6 can correspond to the front edge 114a of the second reflector 114 and the lower edge L2 thereof can correspond to the rear edge 114b thereof. Therefore, the adjustment of the length of the second reflector 114 can control the vertical width of the light distribution pattern P6. For example, the length of the second reflector 114 can be adjusted properly, so that the upper edge L1 of the light distribution pattern P6 can be positioned at the position of a predetermined angle above the horizontal line H-H while the lower edge L2 thereof can be positioned on the horizontal line H-H.

In this case, the luminous intensity of the light from the second lens 111B when it is viewed from a certain viewpoint E in front of the vehicle can be 300 [cd] due to the effect of light projected from the second lens 111B in an upward direction with respect to the horizontal plane, whereby the second lens 111B can be recognized to shine.

As described above, although the light passing through the second lens 111B is relatively low luminous intensity light, the action of the first reflector 113 and the second reflector 114 can direct the relatively low luminous intensity light passing through the second lens 111B to the upper direction with respect to the horizontal plane.

This allows the luminous intensity of the light from the first lens 111A and that from the second lens 111B to match (or substantially match) when they are viewed from a certain viewpoint E in front of the vehicle (a certain viewpoint above the horizontal line H-H, for example, the viewpoint of a pedestrian in front of the vehicle or the driver of an oncoming vehicle, see FIG. 8). (For example, the luminous intensities are 300 [cd].) In this manner, the brightnesses observed through the first and second lenses 111A and 111B are allowed to match (or substantially match) when they are viewed from the certain viewpoint E in front of the vehicle.

Note that when the viewpoint E where an actual viewpoint is placed is shifted forward or rearward, as the distance between the viewpoint E and the shifted viewpoint becomes larger, the difference between the luminous intensities (difference in luminance) of the light from one lens (for example, the first lens 111A) and the other lens (for example, the second lens 111b) when they are viewed from the shifted viewpoint becomes larger. In this case, however, it is considered that the brightnesses of the respective lenses 111A and 111B are not remarkably varied.

Next, a description will be given of the method of adjusting the luminous intensity of the second lens 111B when it is viewed from the certain viewpoint E in front of the vehicle body.

For example, a concave or hollow reflector (or a free curved surface etc. similar thereto) facing the second lens 111B can be used as the second reflector 114 to diffuse the light passing through the second lens 111B vertically and/or horizontally. In this manner, the luminous intensity (luminance) of light through the second lens 111B can be adjusted when the lens is viewed from a viewpoint in front of the vehicle (a viewpoint above the horizontal line H-H). Alternatively, if the vertical length and/or the surface shape of the first reflector 113 is adjusted, the luminous intensity (luminance) of light through the second lens 111B can also be adjusted when the lens is viewed from a viewpoint in front of the vehicle (a viewpoint above the horizontal line H-H).

This allows the luminous intensity of the light from the first lens 111A and that from the second lens 111B to match more close to each other (or substantially match) when they are viewed from a certain viewpoint E in front of the vehicle (a certain viewpoint above the horizontal line H-H, for example, the viewpoint of a pedestrian in front of the vehicle or the driver of an oncoming vehicle, see FIG. 8). (For example, the luminous intensities are 300 [cd].) In this manner, the brightnesses observed through the first and second lenses 111A and 111B are allowed to match more close to each other (or substantially match) when they are viewed from the certain viewpoint E in front of the vehicle.

Next, a description will be given of an optical system configured to form a low-beam light distribution.

The optical system can include the second lens 111B, the second semiconductor light-emitting device 112B, the shade 116, and the like.

FIG. 5B is a perspective view of the second semiconductor light-emitting device 112B.

The second semiconductor light-emitting device 112B can be, for example, a single light source in which a plurality of LED chips 112b (for example, four 1 mm-square blue LED chips) are packaged. Each of the LED chips 112b may be covered with a phosphor (for example, a YAG phosphor (a yellow phosphor)). The number of LED chips 112b is not limited to 4 and may be 1 to 3 or 5 or more. Each of the LED chips 112b can provide high luminance in order to form the low-beam light distribution pattern which is required to be bright.

The respective LED chips 112b can be mounted on a substrate KB secured to the upper surface 119a of the heat sink 119 such that light is emitted substantially upward (in the illustrated example, the light is emitted in a diagonally rearward and upward direction shown in FIG. 10). The LED chips 112a can be disposed on the rear side of the vehicle rear-side focal point $F_{111B}$ of the second lens 111B and placed at or near (i.e., substantially at) the second optical axis $AX_{111B}$. As shown in FIG. 5B, the LED chips 112b can be arranged in a row (in a direction perpendicular to the sheet of FIG. 10) at predetermined intervals with their edges along a horizontal line orthogonal to the second optical axis $AX_{111B}$ so as to be symmetric with respect to the second optical axis $AX_{111B}$.

The substrate KB can be disposed so as to be inclined with respect to the horizontal plane with the vehicle front end side KBa of the substrate KB being higher than its vehicle rear end side KBb (see FIG. 10). Therefore, the element optical axes $AX_{112b}$ of the LED chips 112b can be diagonally rearward and upward. It should be appreciated that the substrate KB may be disposed horizontally such that the vehicle front end side KBa and the vehicle rear end side KBb are on the same horizontal plane.

A power cable can be electrically connected between the second semiconductor light-emitting device 112B and a not-shown lighting circuit, which can supply the second semiconductor light-emitting device 112B with a constant current, thereby performing turning-on/turning-off control. Heat generated from the second semiconductor light-emitting device 112B can be dissipated by the action of the heat sink 119.

The second semiconductor light-emitting device 112B is not limited to include the LED chips 112b so long as it is a light source device including surface light-emitting chips used substantially as point light-emitting chips. For example, the second semiconductor light-emitting device 112B may include light-emitting diodes or laser diodes other than LED chips.

As shown in FIG. 10, the third reflector 115 can be a revolved ellipsoidal reflector (for example, a revolved ellipsoidal surface or a free curved surface similar thereto) that has a first focal point $F1_{115}$ at or near (i.e., substantially at) the second semiconductor light-emitting device 112B and a second focal point $F2_{115}$ at or near (i.e., substantially at) the vehicle rear-side focal point $F_{111B}$ of the second lens 111B.

The third reflector 115 can extend from one side of the second semiconductor light-emitting device 112B (from the vehicle rear side in FIG. 10) toward the second lens 111B and cover the second semiconductor light-emitting device 112B from above. The third reflector 115 can be designed such that relatively high luminous intensity light emitted substantially upward from the second semiconductor light-emitting device 112B in narrow angle directions with respect to the element optical axis $AX_{112b}$ of the second semiconductor light-emitting device 112B (for example, light within about the half value angles (namely, light within ±60° in FIG. 6)) can be incident on the third reflector 115.

The shade 116 can include a minor surface 116a extending from the vehicle rear-side focal point $F_{111B}$ of the second lens 111B toward the second semiconductor light-emitting device 112B. The front edge of the shade 116 can be curved and concaved along a plane that includes the vehicle rear-side focal point of the second lens 111B. The light incident on the minor surface 116a and reflected upward can be refracted by the second lens 111B and directed toward a road surface. More specifically, the light incident on the mirror surface 116a can change its travelling direction so as to be directed below a cut-off line and is superposed onto a light distribution pattern below the cut-off line. In this manner, a low-beam light distribution pattern P3 including the cut-off line CL can be formed as shown in FIG. 9.

The second reflector 114 and the shade 116 can be configured as a single member and formed by subjecting a base material molded integrally using a mold to minor finish processing such as vapor deposition of aluminum. This allows a reduction in the number of components, simplification of the step of attaching the second reflector 114 and the shade 116, a reduction in attachment errors of the second reflector 114 and the shade 116, etc., as compared to the case where the second reflector 114 and the shade 116 are configured as independent components. The second reflector 114 and the shade 116 may not be molded integrally but may be configured as independent components according to intended applications.

Next, a description will be given of an optical system configured to form an overhead sign light distribution pattern.

The optical system can include the second lens 111B, the second semiconductor light-emitting device 112B, the fourth reflector 117, the fifth reflector 118, and the like.

The fourth reflector 117 can be disposed between the second lens 111B and the third reflector 115. The fourth reflector 117 can be designed such that relatively low luminous intensity light emitted substantially upward from the second semiconductor light-emitting device 112B in wide angle directions with respect to the element optical axis $AX_{112b}$ of the second semiconductor light-emitting device 112B (for example, light near the half value angles or outside the angles (namely, light outside ±60° in FIG. 6)) is incident on the second reflector 15. As described before in the first exemplary embodiment, also in the present exemplary embodiment, it should be noted that the light emitted in the narrow angle directions and incident on the first reflector can have a luminous intensity higher than the light emitted in the wide angle directions and incident on the second reflector does.

The fourth reflector 117 can be a planar minor disposed so as to be inclined with respect to the horizontal plane with the vehicle front end side 117a of the reflector 117 being lower than its vehicle rear end side 117b.

The third reflector 115 and the fourth reflector 117 can be configured as a single member and formed by subjecting a base material molded integrally using a mold to minor finish processing such as vapor deposition of aluminum. This allows a reduction in the number of components, simplification of the step of attaching the third reflector 115 and the fourth reflector 117, a reduction in attachment errors of the third reflector 115 and the fourth reflector 117, etc., as compared to the case where the third reflector 115 and the fourth reflector 117 are configured as independent components. The third reflector 115 and the fourth reflector 117 may not be molded integrally but may be configured as independent components according to intended applications.

The fifth reflector 118 can be disposed in an obliquely forward and downward with respect to the fourth reflector 117 so that the light reflected by the fourth reflector 117 obliquely forward and downward can be incident on the fifth reflector 118. In the present exemplary embodiment, the fifth reflector 118 can be part of the second reflector 114 at or near (i.e., substantially at) the focal point $F_{111B}$ of the second lens 111B.

The fifth reflector 118 can be inclined in order to reflect light from the fourth reflector 117 and cause the reflected light to pass through the second lens 111B and be projected in a direction upward with respect to the horizontal plane by a predetermined angle (for example, in the range of 2° to 4° above the horizontal line), thereby illuminating the overhead sign region A on the virtual vertical screen (which is, for example, disposed about 25 m ahead of the front end of the vehicle) with the light. The overhead sign region A means a region that is on a virtual vertical screen disposed about 25 m ahead of the front end of the vehicle, is located above the horizontal line, and subtends 2° to 4°, and where a road guide, a road sign, etc. is present (see FIG. 9).

Next, a description will be given of the operation example of the vehicle lighting unit 110 with the above configuration.

When a switch (not shown) connected to the not-shown lighting circuit is caused to select high-beam light projection, the lighting circuit can supply the first semiconductor light-emitting device 112A with a constant current I4, thereby turning on the first semiconductor light-emitting device 112A (while the second semiconductor light-emitting device 112B is still turned off).

In this case, the light emitted from the first semiconductor light-emitting device 112A can pass the following optical path.

First, relatively high luminous intensity light emitted from the first semiconductor light-emitting device 112A in narrow angle directions with respect to the element optical axis $AX_{112a}$ of the first semiconductor light-emitting device 112A (for example, light within ±25° in FIG. 6)) can be allowed to pass through the first lens 111A and projected in directions upward and downward with respect to the horizontal plane.

In this manner, as shown in FIG. 11A, the light distribution pattern P5 that is suitable for a high-beam light distribution pattern and is a spot light projected in an area including the intersection of the horizontal line H-H and the vertical line V-V can thereby be formed as shown on the virtual vertical screen (which is, for example, disposed about 25 m ahead of the front end of the vehicle).

On the other hand, the relatively low luminous intensity light emitted from the first semiconductor light-emitting device 112A in the wide angle directions with respect to the element optical axis $AX_{112a}$ of the first semiconductor light-emitting device 112A (for example, light outside ±25° in FIG. 6) can be reflected by the first reflector 113 and the second reflector 114 and then pass through the second lens 111B to be projected forward.

In this manner, as shown in FIG. 11B, the light distribution pattern P6 that is a spot light projected in an area above the horizontal line H-H and including the intersection of the horizontal line H-H and the vertical line V-V can thereby be formed as shown on the virtual vertical screen (which is, for example, disposed about 25 m ahead of the front end of the vehicle).

In this manner, the light distribution pattern P5 and the second light distribution pattern P6 can be superposed upon each other to form a synthesized light distribution pattern suitable for the high-beam light distribution pattern.

In the above configuration, the light allowed to pass through the second lens 111B may be mainly the relatively low luminous intensity light, and the action of the first reflector 113 and the second reflector 114 can project the light passing through the second lens 111B only or substantially only in upward directions with respect to the horizontal plane.

This allows the luminous intensity of the light from the first lens 111A and that from the second lens 111B to match (or substantially match) when they are viewed from a certain viewpoint E in front of the vehicle (a certain viewpoint above the horizontal line H-H, for example, the viewpoint of a pedestrian in front of the vehicle or the driver of an oncoming vehicle, see FIG. 8). In this manner, the brightnesses observed through the first and second lenses 111A and 111B can be allowed to match (or substantially match) when they are viewed from the certain viewpoint E in front of the vehicle.

When the not-shown switch connected to the not-shown lighting circuit is caused to select a low-beam light projection, the lighting circuit can stop supplying the first semiconductor light-emitting device 112A with the constant current I4 and supply the second semiconductor light-emitting device 112B with a constant current I3, thereby turning on the second semiconductor light-emitting device 112B while the first semiconductor light-emitting device 112A is not turned on.

In this case, the second semiconductor light-emitting device 112B can pass the following optical path.

Specifically, the light emitted from the second semiconductor light-emitting device 112B and being incident on the third reflector 115 can be reflected by the third reflector 115 and focused on or near the vehicle rear-side focal point $F_{111B}$ of the second lens 111B, and then pass through the second lens 111B to be projected forward. In this manner, as shown in FIG. 9, the low beam light distribution pattern P3 including the cut-off line CL can be formed on a virtual vertical screen (disposed, for example, about 25 m ahead of the front end of the vehicle).

On the other hand, light emitted from the second semiconductor light-emitting device 112B and being incident on the fourth reflector 117 can be reflected by the fourth reflector 117 and the fifth reflector 118 and allowed to pass through the second lens 111B and projected in directions upward with respect to the horizontal plane (for example, in an angle range of 2 degrees to 4 degrees above the horizontal line, for example). In this manner, the overhead sign light distribution pattern P4 can thereby be formed in the overhead sign region A on the virtual vertical screen (which is, for example, disposed about 25 m ahead of the front end of the vehicle), as shown in FIG. 9.

The optical axes of the vehicle lighting unit 110 have been adjusted using well-known aiming mechanisms (not shown) such that the respective light distribution patterns P3 to P6 are projected onto proper regions on the virtual vertical screen.

As described above, according to the vehicle lighting unit 110 of the present exemplary embodiment, the light allowed to pass through the second lens 111B may be mainly the relatively low luminous intensity light, and the action of the first reflector 113 and the second reflector 114 can project the relatively low luminous intensity light passing through the second lens 111B only or substantially only in upward directions with respect to the horizontal plane (for example, in a range of 0 degrees to 10 degrees above the horizontal line H-H).

This allows the luminous intensity of the light from the first lens 111A and that from the second lens 111B to match (or substantially match) when they are viewed from a certain viewpoint E in front of the vehicle (a viewpoint above the horizontal line H-H, for example, the viewpoint of a pedestrian in front of the vehicle or the driver of an oncoming vehicle, see FIG. 8). In this manner, the brightnesses observed through the first lens 111A and the second lens 111B can be allowed to match (or substantially match) when they are viewed from the certain viewpoint E in front of the vehicle.

In addition, the vehicle lighting unit 110 of the present exemplary embodiment can turn the first semiconductor light-emitting device 112A ON and the second semiconductor light-emitting device 112B OFF, thereby serving as a vehicle headlamp for forming the high-beam light distribution patterns P5 and P6, as shown in FIGS. 11A and 11B. On the contrary the vehicle lighting unit 110 can turn the first semiconductor light-emitting device 112A OFF and the second semiconductor light-emitting device 112B ON, thereby serving as a vehicle headlamp for forming the low-beam light distribution pattern P3, as shown in FIG. 9.

With the above configuration, the vehicle lighting unit 110 of the present exemplary embodiment can serve as a vehicle lighting unit capable of forming a high-beam light distribution pattern and/or a low-beam light distribution pattern.

Further, in the vehicle lighting unit 110 of the present exemplary embodiment, the distance between the first lens 111A at its lower edge and the second lens 111B at its upper edge in the vertical direction can be 15 mm or less. In the vehicle lighting unit 110 configured as above, the first lens 111A and the second lens 111B can be visually recognized as a single light-emitting region.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit, having an upper first optical axis configured to extend in a front-rear direction of a vehicle and a lower second optical axis configured to extend in the front-rear direction of the vehicle and positioned below the first optical axis, the vehicle lighting unit comprising:
   a first lens disposed on the first optical axis and having a focal point on a vehicle rear-side of the first lens;
   a second lens disposed on the second optical axis and having a focal point on a vehicle rear-side of the second lens;
   a first semiconductor light-emitting device disposed substantially at the vehicle rear-side focal point of the first lens and having a light emission surface configured to direct light during operation to the first lens and along an element optical axis such that light emitted from the first semiconductor light-emitting device in a narrow angle direction with respect to the element optical axis is incident on the first lens;
   a first reflector disposed diagonally forward and downward with respect to the first semiconductor light-emitting device such that light emitted from the first semiconductor light-emitting device in a wide angle direction, wider than the narrow angle direction with respect to the element optical axis, is incident on the first reflector and reflected diagonally rearward and downward, the light emitted in the narrow angle direction and incident on the first lens having a luminous intensity higher than luminous intensity of the light emitted in the wide angle direction and incident on the first reflector; and
   a second reflector disposed diagonally rearward and downward with respect to the first reflector such that the light reflected diagonally rearward and downward from the first reflector is incident on the second reflector, wherein the second reflector extends from a point substantially at the vehicle rear-side focal point of the second lens to an area diagonally forward and downward with respect to the vehicle rear-side focal point of the second lens and the second optical axis, respectively.

2. The vehicle lighting unit according to claim 1, further comprising:
   a second semiconductor light-emitting device disposed on a rear side of the vehicle rear-side focal point of the second lens and configured to emit light substantially upward and along an element optical axis of the second semiconductor light-emitting device;
   a third reflector disposed above the second semiconductor light-emitting device such that light emitted from the second semiconductor light-emitting device in a narrow angle direction with respect to the element optical axis of the second semiconductor light-emitting device is incident on the third reflector, the light emitted in the narrow angle direction and incident on the third reflector having a luminous intensity higher than luminous intensity of light emitted from the second semiconductor light-emitting device in a wide angle direction wider than the narrow angle direction; and
   a shade disposed between the second lens and the second semiconductor light-emitting device and configured to block part of light emitted from the second semiconductor light-emitting device and reflected by the third reflector, wherein
   the third reflector is a revolved ellipsoidal reflector having a first focal point substantially at the second semiconductor light-emitting device and a second focal point substantially at the vehicle rear-side focal point of the second lens.

3. The vehicle lighting unit according to claim 1, wherein a distance between the first lens at its lowermost edge and the second lens at its uppermost edge in a vertical direction is 15 mm or less.

4. The vehicle lighting unit according to claim 2, wherein a distance between the first lens at its lowermost edge and the second lens at its uppermost edge in a vertical direction is 15 mm or less.

5. The vehicle lighting unit according to claim 1, wherein the narrow angle direction is a range within ±60° with respect to the element optical axis and the wide angle direction is a range outside ±60° with respect to the element optical axis.

6. The vehicle lighting unit according to claim 2, wherein the narrow angle direction is a range within ±60° with respect to the element optical axis and the wide angle direction is a range outside ±60° with respect to the element optical axis.

7. The vehicle lighting unit according to claim 3, wherein the narrow angle direction is a range within ±60° with respect to the element optical axis and the wide angle direction is a range outside ±60° with respect to the element optical axis.

8. The vehicle lighting unit according to claim 4, wherein the narrow angle direction is a range within ±60° with respect to the element optical axis and the wide angle direction is a range outside ±60° with respect to the element optical axis.

9. The vehicle lighting unit according to claim 1, wherein the narrow angle direction is a range within ±25° with respect to the element optical axis and the wide angle direction is a range outside ±25° with respect to the element optical axis.

10. The vehicle lighting unit according to claim 2, wherein the narrow angle direction is a range within ±25° with respect to the element optical axis and the wide angle direction is a range outside ±25° with respect to the element optical axis.

11. The vehicle lighting unit according to claim 3, wherein the narrow angle direction is a range within ±25° with respect to the element optical axis and the wide angle direction is a range outside ±25° with respect to the element optical axis.

12. The vehicle lighting unit according to claim 4, wherein the narrow angle direction is a range within ±25° with respect to the element optical axis and the wide angle direction is a range outside ±25° with respect to the element optical axis.

13. The vehicle lighting unit according to claim 2, further comprising:
   a fourth reflector disposed between the second lens and the third reflector.

14. The vehicle lighting unit according to claim 13, further comprising:
   a fifth reflector disposed obliquely forward and downward with respect to the fourth reflector.

15. The vehicle lighting unit according to claim 1, further comprising:
   a fourth reflector disposed between the second lens and the third reflector.

16. The vehicle lighting unit according to claim 15, further comprising:
   a fifth reflector disposed obliquely forward and downward with respect to the fourth reflector.

17. A vehicle lighting unit configured to be attached to a vehicle, comprising:
   a first lens having a first optical axis extending in a front-rear direction of the vehicle and having a focal point on a vehicle rear-side of the first lens;
   a second lens having a second optical axis positioned below the first optical axis and extending in the front-rear direction of the vehicle, the second lens having a focal point on a vehicle rear-side of the second lens;
   a first semiconductor light-emitting device disposed substantially at the vehicle rear-side focal point of the first lens and configured to emit light in a direction along an element optical axis that intersects with the first lens such that light emitted from the first semiconductor light-emitting device in a narrow angle direction intersects with the first lens;
   a first reflector disposed diagonally forward and downward with respect to the first semiconductor light-emitting device such that light emitted from the first semiconductor light-emitting device in a wide angle direction, wider than the narrow angle direction with respect to the element optical axis, is incident on the first reflector and reflected diagonally rearward and downward, the light emitted in the narrow angle direction and incident on the first lens having a luminous intensity higher than luminous intensity of the light emitted in the wide angle direction; and
   a second reflector disposed diagonally rearward and downward with respect to the first reflector such that the light reflected diagonally rearward and downward from the first reflector is incident on the second reflector, wherein
   the second reflector extends from a point substantially at the vehicle rear-side focal point of the second lens to an area diagonally forward and downward with respect to the vehicle rear-side focal point of the second lens and the second optical axis, respectively.

18. The vehicle lighting unit according to claim 17, further comprising:
   a second semiconductor light-emitting device disposed on a rear side of the vehicle rear-side focal point of the second lens and configured to emit light substantially perpendicular with the optical axis of the second lens and along an element optical axis of the second semiconductor light-emitting device;

a third reflector disposed above the second semiconductor light-emitting device such that light emitted from the second semiconductor light-emitting device in a narrow angle direction with respect to the element optical axis of the second semiconductor light-emitting device is incident on the third reflector, the light emitted in the narrow angle direction and incident on the third reflector having a luminous intensity higher than luminous intensity of light emitted from the second semiconductor light-emitting device in a wide angle direction wider than the narrow angle direction; and a shade disposed between the second lens and the second semiconductor light-emitting device and configured to block part of light emitted from the second semiconductor light-emitting device and reflected by the third reflector, wherein the third reflector is a revolved ellipsoidal reflector having a first focal point substantially at the second semiconductor light-emitting device and a second focal point substantially at the vehicle rear-side focal point of the second lens.

19. The vehicle lighting unit according to claim 17, wherein a distance between the first lens at its lowermost edge and the second lens at its uppermost edge in a vertical direction is 15 mm or less.

* * * * *